(12) United States Patent
Takazawa et al.

(10) Patent No.: US 8,339,916 B2
(45) Date of Patent: *Dec. 25, 2012

(54) OPTICAL RECORDING MEDIUM, INFORMATION RECORDING METHOD, AND INFORMATION REPRODUCING METHOD

(75) Inventors: Koji Takazawa, Tokyo (JP); Seiji Morita, Yokohama (JP); Kazuyo Umezawa, Yokohama (JP); Naoki Morishita, Yokohama (JP); Yasuaki Ootera, Yokohama (JP); Hideo Ando, Hino (JP); Naomasa Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/094,100

(22) Filed: Apr. 26, 2011

(65) Prior Publication Data

US 2011/0199881 A1 Aug. 18, 2011

Related U.S. Application Data

(62) Division of application No. 12/754,392, filed on Apr. 5, 2010, now Pat. No. 7,995,442, which is a division of application No. 11/756,128, filed on May 31, 2007, now Pat. No. 7,715,304.

(30) Foreign Application Priority Data

Jun. 2, 2006 (JP) .................................. 2006-155110

(51) Int. Cl.
*G11B 7/00* (2006.01)

(52) U.S. Cl. ............ 369/59.11; 369/59.1; 369/116; 369/47.5; 369/275.1

(58) Field of Classification Search .................. None
See application file for complete search history.

(56) References Cited

U.S. PATENT DOCUMENTS

| 5,236,755 A | 8/1993 | Howe et al. |
| 5,811,217 A | 9/1998 | Akahira et al. |
| 6,042,919 A | 3/2000 | Gorsuch |
| 6,268,034 B1 | 7/2001 | Kitaura et al. |
| 7,012,871 B2 | 3/2006 | Miyamoto et al. |
| 7,057,252 B2 | 6/2006 | Uno et al. |

(Continued)

FOREIGN PATENT DOCUMENTS

EP 1 096 484 A2 5/2001

(Continued)

OTHER PUBLICATIONS

Japanese Office Action issued Aug. 23, 2011, in Patent Application No. 2010-016494 (with English-language translation).

(Continued)

*Primary Examiner* — Muhammad N Edun
(74) *Attorney, Agent, or Firm* — Oblon, Spivak, McClelland, Maier & Neustadt, L.L.P.

(57) ABSTRACT

According to one embodiment, an optical recording medium is provided in which interlayer crosstalk is low and in which stable and high-quality recording characteristics can be obtained. To this end, an optical recording medium comprises a first recording part which includes a first recording layer and a first light reflecting layer and which is disposed on a side closer to a light receiving surface, and a second recording part which includes a second recording layer and a second light reflecting layer and which is disposed on a side farther from the light receiving surface, the first recording part and the second recording part being stacked, wherein the thickness of the second light reflecting layer is larger than the thickness of the first light reflecting layer.

3 Claims, 18 Drawing Sheets

U.S. PATENT DOCUMENTS

| | | |
|---|---|---|
| 7,301,884 B2 | 11/2007 | Ahn et al. |
| 2002/0085466 A1 | 7/2002 | Shim |
| 2004/0114488 A1 | 6/2004 | Sawada et al. |
| 2004/0233830 A1 | 11/2004 | Usami et al. |
| 2004/0241575 A1 | 12/2004 | Ootera |
| 2005/0063266 A1 | 3/2005 | Kim |
| 2005/0063274 A1 | 3/2005 | Nagano et al. |
| 2005/0073943 A1 | 4/2005 | Oshima et al. |
| 2005/0270959 A1 | 12/2005 | Iwasa et al. |
| 2006/0013111 A1 | 1/2006 | Inoue et al. |
| 2006/0110570 A1 | 5/2006 | Yeh et al. |
| 2006/0215512 A1 | 9/2006 | Kim |

FOREIGN PATENT DOCUMENTS

| | | |
|---|---|---|
| EP | 1 347 448 A1 | 9/2003 |
| EP | 1 378 895 A2 | 1/2004 |
| EP | 1-496507 | 1/2005 |
| EP | 1 569 208 A1 | 8/2005 |
| EP | 1 602 968 A2 | 12/2005 |
| EP | 1 626 400 A1 | 2/2006 |
| EP | 1-860658 | 11/2007 |
| JP | 2002-373426 | 12/2002 |
| JP | 2003-187443 | 7/2003 |
| JP | 2003-257025 | 9/2003 |
| JP | 2004-001375 | 1/2004 |
| JP | 2005-122872 | 5/2005 |
| JP | 2005-153496 | 6/2005 |
| JP | 2005-166096 | 6/2005 |
| JP | 2005-288972 | 10/2005 |
| JP | 2005-339761 | 12/2005 |
| JP | 2005-353280 | 12/2005 |
| JP | 2006-48905 | 2/2006 |
| JP | 2007-323776 | 12/2007 |
| TW | 200537461 | 11/2005 |
| WO | WO 2005/017879 A2 | 2/2005 |
| WO | WO 2006/004172 A1 | 1/2006 |
| WO | WO 2006/049006 A1 | 5/2006 |
| WO | 2006/104196 | 10/2006 |
| WO | 2007/007748 | 1/2007 |

OTHER PUBLICATIONS

Japanese Office Action issued Aug. 23, 2011, in Patent Application No. 2010-016495 (with Enlgish-language translation).

ECMA: Standardizing Information and Communication Systems: "Standard ECMA-267: 120 mm DVD-Read-Only Disk" Standard ECMA-267, No. 272, Apr. 1, 2001, pp. 1-86, XP002258081.

ECMA: Standardizing Information and Communication Systems: "Standard ECMA-272, 2nd edition: 120 mm DVD-RewritableDisk (DVD-RAM)" Standard ECMA-272, XX, XX, No. 272, Jun. 1, 1999, pp. 1-99, XP002186767.

Extended European Search Report issued Jun. 9, 2011, in European Patent Application No. 11162904.4.

Extended European Search Report issued Jun. 16, 2011, in European Patent Application No. 11162905.1.

Extended European Search Report issued Jun. 30, 2011, in European Patent Application No. 11162907.7.

Anonymous: "White paper Blu-ray Disc Format, 1. B Physical Format Specifications for BD-R", White Paper Blu-Ray Disc, Blu-Ray Disc Founders, XP-002324152, Aug. 1, 2004, pp. 1-33.

Anonymous: "Standard ECMA-364, $1^{st}$ Edition, Data interchange on 120 mm and 80 mm Optical Disk using +R DL Format-Capacity: 8,55 and 2,66 Gbytes per side (Recording speed 2,4x)", ECMA International, XP-002639565, URL:http://www.ecma-international.org/publications/files/ECMA-ST-WITHDRAWN/ECMA-364,%201st%20edition,%20June%202005.pdf, Jun. 2005, 158 pages.

Office Action issued Oct. 23, 2012, in Japanese Patent Application No. 2011-233304 (with English-language Translation).

<Example of setting general parameters in recordable information storage medium>

| Parameter | | Single layer structure | Dual layer structure |
|---|---|---|---|
| Recording capacity available to user | | 15Gbytes/side | 30Gbytes/side |
| Wavelength to be used | | 405nm | 405nm |
| NA value of objective lens | | 0.65 | 0.65 |
| Data bit length | (A) | 0.306μm | 0.306μm |
| | (B) | 0.153μm | 0.153μm |
| Channel bit length | (A) | 0.204μm | 0.204μm |
| | (B) | 0.102μm | 0.102μm |
| Minimum mark/bit length (2T) | (A) | 0.408μm | 0.408μm |
| | (B) | 0.204μm | 0.204μm |
| Maximum mark/bit length (13T) | (A) | 2.652μm | 2.652μm |
| | (B) | 1.326μm | 1.326μm |
| Track pitch | (A) | 0.68μm | 0.68μm |
| | (B) | 0.40μm | 0.40μm |
| Physical address setting method | (B) | Wobble address | Wobble address |
| Outside diameter of information storage medium | | 120mm | 120mm |
| Total thickness of information storage medium | | 1.20mm | 1.20mm |
| Diameter of center hole | | 15.0mm | 15.0mm |
| Inside radius of data area DTA | | 24.1mm | 24.6mm(Layer 0) 24.7mm(Layer 1) |
| Outside radius of data area DTA | | 58.0mm | 58.1mm |
| Sector size | | 2048bytes | 2048bytes |
| ECC (Error Correction Code) | | Reed-Solomon product code RS(208, 192, 17)× RS(182, 172,11) | Reed-Solomon product code RS(208, 192, 17)× RS(182, 172,11) |
| ECC block size | | 32 physical sectors | 32 physical sectors |
| Modulation method | | ETM, RLL(1, 10) | ETM, RLL(1, 10) |
| Error correctable error length | | 7.1mm | 7.1mm |
| Linear velocity | | 6.61m/s | 6.61m/s |
| Channel bit transfer rate | (A) | 32.40Mbps | 32.40Mbps |
| | (B) | 64.80Mbps | 64.80Mbps |
| User data transfer rate | (A) | 18.28Mbps | 18.28Mbps |
| | (B) | 36.55Mbps | 36.55Mbps |

(A) indicates numerical values in system lead-in area SYLDI and system lead-out area SYLDO
(B) indicates numerical value in data lead-in area DTLDI, data area DTA, middle area and data lead-out area DTLDO

FIG. 4

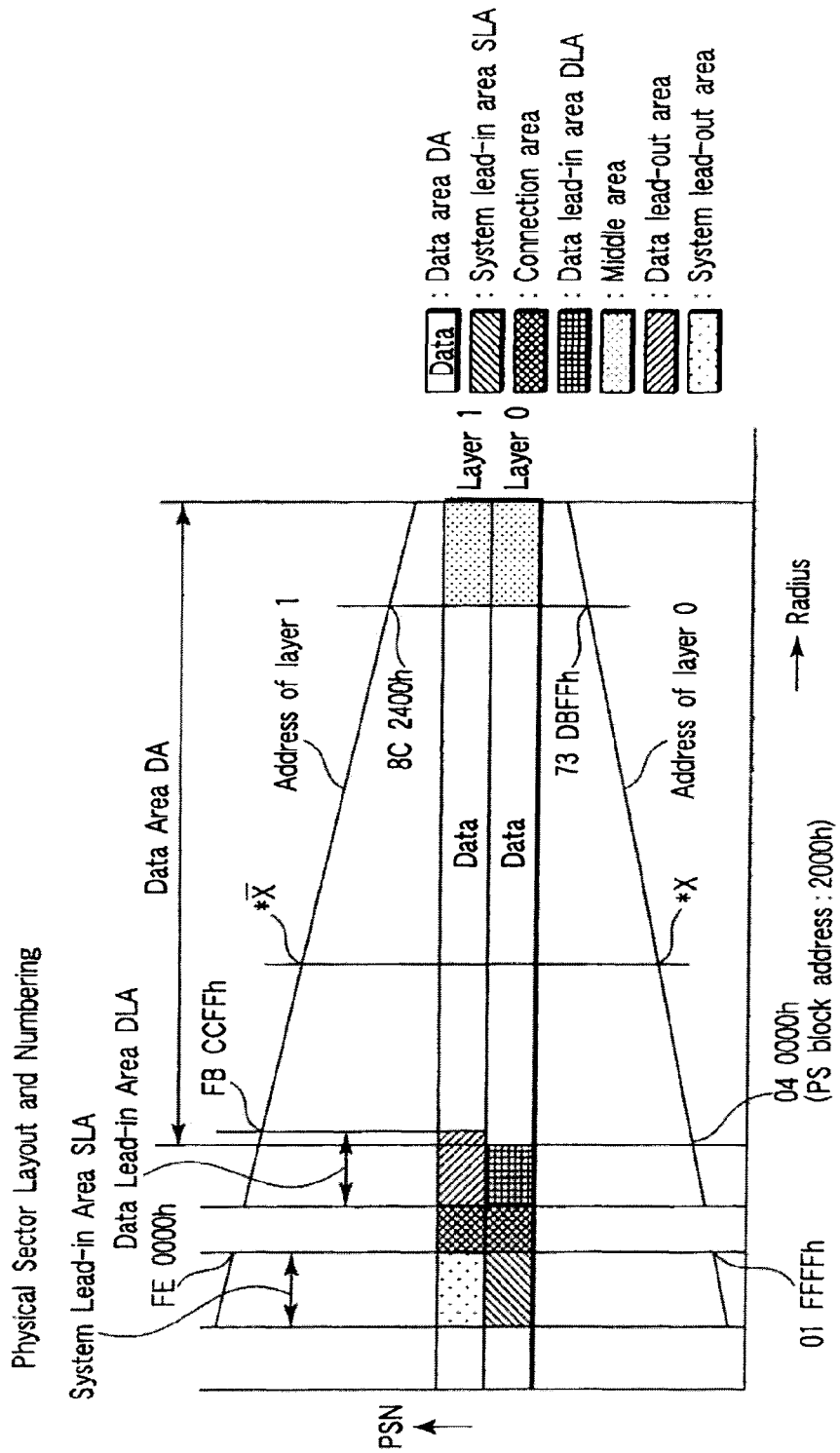
F I G. 7

Structure of Control Data Zone

Structure of Data Segement in Control Data Section

Physical Format Information

| BP | Contents |
|---|---|
| 0 | Book type and part version |
| 1 | Disc size and maximum transfer rate of the disc |
| 2 | Disc structure |
| 3 | Recording density |
| 4 to 15 | Data area allocation |
| 16 | BCA descriptor |
| 17 | Revision number of maximum recording speed |
| 18 | Revision number of minimum recording speed |
| 19 to 25 | Revision number table |
| 26 | Class |
| 27 | Extended part version |
| 28 to 31 | reserved |
| 32 | Actual number of maximum reading speed |
| 33 | Layer format table |
| 34 to 127 | reserved |
| 128 | Mark polarity descriptor |
| 129 | Velocity |
| 130 | Rim intensity in tangential direction |
| 131 | Rim intensity in radial direction |
| 132 | Read power |
| 133 | Actual number of minimum recording speed |
| 134 | Actual number of 2nd recording speed |
| 135 | Actual number of 3rd recording speed |
| 136 | Actual number of 4th recording speed |
| 137 | Actual number of 5th recording speed |
| 138 | Actual number of 6th recording speed |
| 139 | Actual number of 7th recording speed |
| 140 | Actual number of 8th recording speed |
| 141 | Actual number of 9th recording speed |
| 142 | Actual number of 10th recording speed |
| 143 | Actual number of 11th recording speed |
| 144 | Actual number of 12th recording speed |
| 145 | Actual number of 13th recording speed |
| 146 | Actual number of 14th recording speed |
| 147 | Actual number of 15th recording speed |
| 148 | Actual number of maximum recording speed |
| 149 | Reflectivity of data area for layer 0 |
| 150 | Push-pull signal for layer 0 |
| 151 | On track signal for layer 0 |
| 152 | Reflectivity of data area for layer 1 |
| 153 | Push-pull signal for layer 1 |
| 154 | On track signal for layer 1 |
| 155 to 2047 | reserved |

FIG. 11

Note: BP 0 to BP 31 comprise the common data used for the DVD family.
BP 32 to BP 2047 area used for unique information for each book.

Data Area Allocation

| BP | Contents |
|---|---|
| 4 | 00h |
| 5 to 7 | Start PSN of the data area (04 0000h) |
| 8 | 00h |
| 9 to 11 | Maximum PSN of data recordable area (FB CCFFh) |
| 12 | 00h |
| 13 to 15 | End PSN on Layer 0 (73 DBFFh) |

FIG. 12

Physical Format Information (L0)

| BP | Contents |
|---|---|
| 0 to 511 | |
| 512 | Peak power for layer 0 |
| 513 | Bias power1 for layer 0 |
| 514 | Bias power2 for layer 0 |
| 515 | Bias power3 for layer 0 |
| 516 | First pulse end time for layer 0 |
| 517 | Multi pulse duration for layer 0 |
| 518 | Last pulse duration for layer 0 |
| 519 | Bias power2 duration for layer 0, 2T mark |
| 520 | Bias power2 duration for layer 0, 3T mark |
| 521 | Bias power2 duration for layer 0, $\geq$4T mark |
| 522 | First pulse start time for layer 0, 2T mark, leading 2T space |
| 523 | First pulse start time for layer 0, 3T mark, leading 2T space |
| 524 | First pulse start time for layer 0, $\geq$4T mark, leading 2T space |
| 525 | First pulse start time for layer 0, 2T mark, leading 3T space |
| 526 | First pulse start time for layer 0, 3T mark, leading 3T space |
| 527 | First pulse start time for layer 0, $\geq$4T mark, leading 3T space |
| 528 | First pulse start time for layer 0, 2T mark, leading $\geq$4T space |
| 529 | First pulse start time for layer 0, 3T mark, leading $\geq$4T space |
| 530 | First pulse start time for layer 0, $\geq$4T mark, leading $\geq$4T space |
| 531 | Last pulse end time for layer 0, 2T mark, trailing 2T space |
| 532 | Last pulse end time for layer 0, 3T mark, trailing 2T space |
| 533 | Last pulse end time for layer 0, $\geq$4T mark, trailing 2T space |
| 534 | Last pulse end time for layer 0, 2T mark, trailing 3T space |
| 535 | Last pulse end time for layer 0, 3T mark, trailing 3T space |
| 536 | Last pulse end time for layer 0, $\geq$4T mark, trailing 3T space |
| 537 | Last pulse end time for layer 0, 2T mark, trailing $\geq$4T space |
| 538 | Last pulse end time for layer 0, 3T mark, trailing $\geq$4T space |
| 539 | Last pulse end time for layer 0, $\geq$4T mark, trailing $\geq$4T space |
| 540 to 543 | reserved |

FIG. 13

Physical Format Information (L1)

| BP | Contents |
|---|---|
| 544 | Peak power for layer 1 |
| 545 | Bias power1 for layer 1 |
| 546 | Bias power2 for layer 1 |
| 547 | Bias power3 for layer 1 |
| 548 | First pulse end time for layer 1 |
| 549 | Multi pulse duration for layer 1 |
| 550 | Last pulse start time for layer 1 |
| 551 | Bias power2 duration for layer 1, 2T mark |
| 552 | Bias power2 duration for layer 1, 3T mark |
| 553 | Bias power2 duration for layer 1, $\geq$4T mark |
| 554 | First pulse start time for layer 1, 2T mark, leading 2T space |
| 555 | First pulse start time for layer 1, 3T mark, leading 2T space |
| 556 | First pulse start time for layer 1, $\geq$4T mark, leading 2T space |
| 557 | First pulse start time for layer 1, 2T mark, leading 3T space |
| 558 | First pulse start time for layer 1, 3T mark, leading 3T space |
| 559 | First pulse start time for layer 1, $\geq$4T mark, leading 3T space |
| 560 | First pulse start time for layer 1, 2T mark, leading $\geq$4T space |
| 561 | First pulse start time for layer 1, 3T mark, leading $\geq$4T space |
| 562 | First pulse start time for layer 1, $\geq$4T mark, leading $\geq$4T space |
| 563 | Last pulse end time for layer 1, 2T mark, trailing 2T space |
| 564 | Last pulse end time for layer 1, 3T mark, trailing 2T space |
| 565 | Last pulse end time for layer 1, $\geq$4T mark, trailing 2T space |
| 566 | Last pulse end time for layer 1, 2T mark, trailing 3T space |
| 567 | Last pulse end time for layer 1, 3T mark, trailing 3T space |
| 568 | Last pulse end time for layer 1, $\geq$4T mark, trailing 3T space |
| 569 | Last pulse end time for layer 1, 2T mark, trailing $\geq$4T space |
| 570 | Last pulse end time for layer 1, 3T mark, trailing $\geq$4T space |
| 571 | Last pulse end time for layer 1, $\geq$4T mark, trailing $\geq$4T space |
| 572 to 2047 | reserved |

Note: BP 0 to BP 31 comprise the common data used for the DVD family.
     BP 32 to BP 2047 area used for unique information for each book.
     T denotes the channel clock period.

FIG. 14

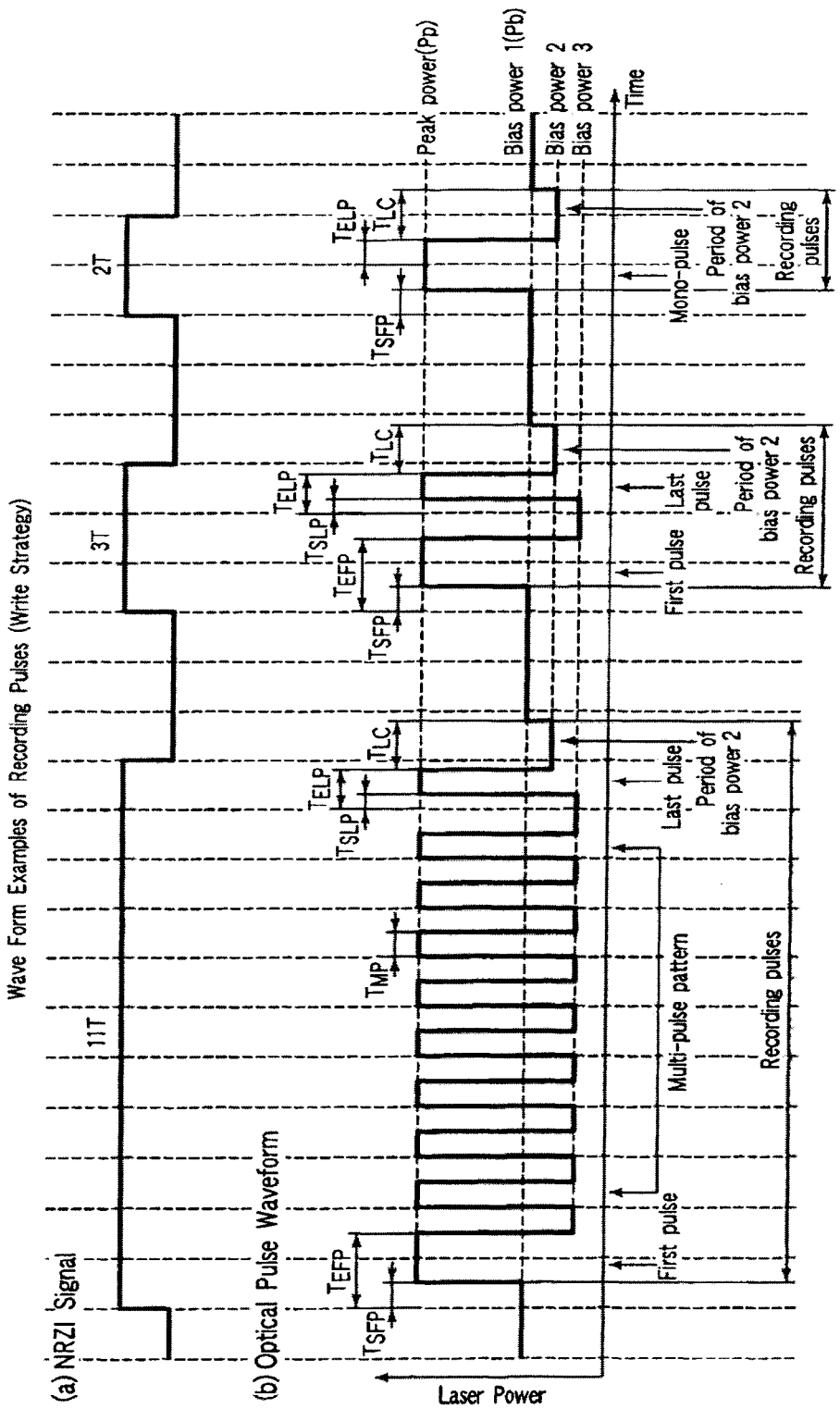
F I G. 15

Example of contents of BCA record of dual-layer HD_DVD-R

| Byte Position | Contents | Number of bytes |
|---|---|---|
| 0 to 1 | BCA Record ID | 2 bytes |
| 2 | Version number | 1 byte |
| 3 | Data length | 1 byte |
| 4 | Book type and Disc type | 1 byte |
| 5 | Extended Part version | 1 byte |
| 6 to 7 | Reserved | 2 bytes |

BCA Record ID ... 0001 0000 0000 0001b : 1001h
HD DVD book type Indentifier

FIG. 17A

| b7 | b6 | b5 | b4 | b3 | b2 | b1 | b0 |
|---|---|---|---|---|---|---|---|
| Book type | | | | Disc type | | | |

| b3 | b2 | b1 | b0 |
|---|---|---|---|
| Mark polarity | Twin format flag | reserved | |

Book type ... 0110b : DVD Specifications for
High Density Recordable Disc (HD DVD-R)

Disc type shall be as follow

Mark polarity ... 0b : signal from mark is larger than signal
from space, Low-to-High disc
1b : signal from mark is smaller than signal
from space, Low-to-High disc Twin format flag ... 0b : Not Twin format disc

FIG. 17B

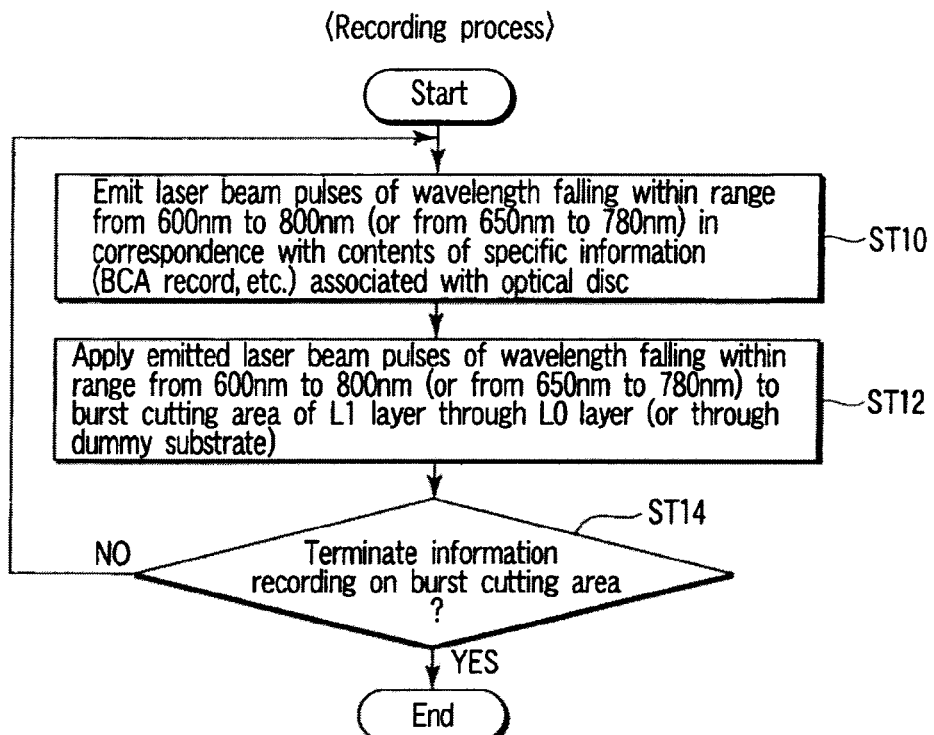
F I G. 19
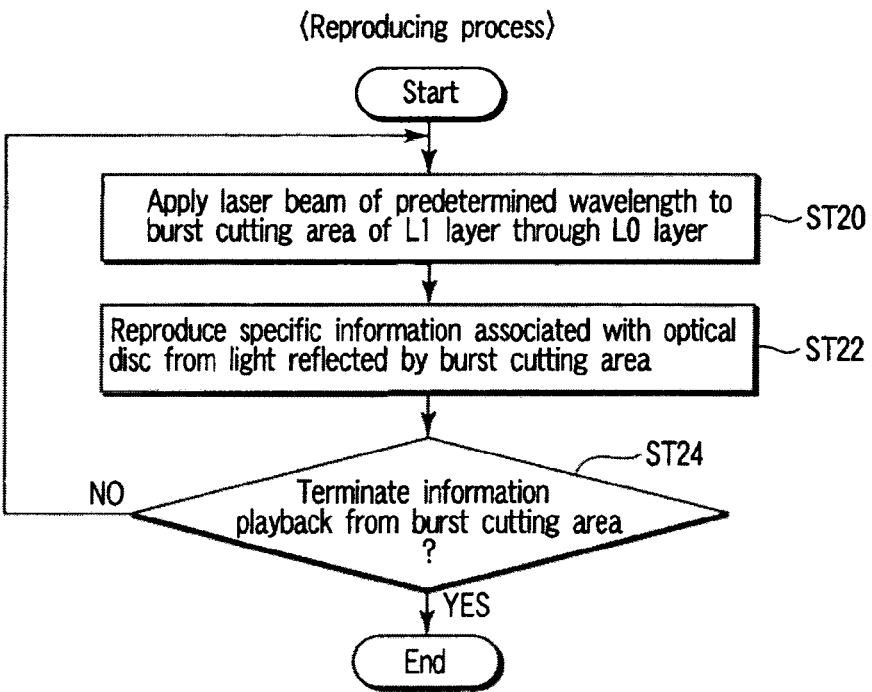
F I G. 20

OPTICAL RECORDING MEDIUM, INFORMATION RECORDING METHOD, AND INFORMATION REPRODUCING METHOD

CROSS-REFERENCE TO RELATED APPLICATIONS

This application is a divisional application of U.S. Ser. No. 12/754,392 filed Apr. 5, 2010 which is a divisional application of U.S. Ser. No. 11/756,128 filed May 31, 2007, which claims priority under 35 U.S.C. 119(a)-(d) to Japanese Patent Application No. 2006-155110, filed Jun. 2, 2006, the entire contents of each of which are incorporated herein by reference.

BACKGROUND

1. Field

One embodiment of the present invention relates to a recordable optical recording medium for recording and playing back information by optical changes in the transmittance, reflectance, etc. of a recording layer induced by the application of a light beam.

2. Description of the Related Art

In an optical recording medium such as a CD-R or a DVD-R using a dye material, part of a recording wavelength is optically absorbed in an organic dye thin film used in a recording layer, and the decomposition of the organic dye thin film and the physical deformation of a recording film are caused by heat generation in the recording layer due to the optical absorption, thereby achieving signal recording. Development has hitherto been made to increase recording density by reducing the wavelength of recording laser. A certain degree of density enhancement is possible when recent blue laser of about 400 nm is applied, but it has naturally started to face a limit in recording capacity. There is used a technique of, for example, multiplying the recording layer in order to achieve higher recording density, and, for example, a dual-layer DVD-R has been commercialized. However, for the multiplication of layers, the optical transmittance and optical absorptance of the recording layers have to be strictly controlled and the structure of the disc has to be optimized so that a stable recording/playback signal can be obtained. However, the techniques for producing multiple layers out of the dye material have not yet reached a practically adequate level due to technical difficulties. Therefore, the selling prices of such discs are higher than those of single-layer discs. Behind such circumstances, there has been reported a disc in which the order of forming the recording films in a layer located on a far side when viewed from a light entering surface is reversed to a conventional order in order to improve recording characteristics of the multilayer disc.

For example, Jpn. Pat. Appln. KOKAI Publication No. 2005-339761 suggests the introduction of a metal oxide layer between a dye layer and a reflecting layer to improve recording/playback characteristics, a dye recording film needs to be formed on a reflecting film in the configuration of a recording layer, and a new protective layer needs to be created to prevent the interference between a bonding resin used in an intermediate layer and the dye material. A process of manufacturing the conventional single-layer disc using the dye material is not easily adapted to the multilayer disc, and production costs can be increased if high mass productivity and production yield are to be maintained because strict management of production is demanded.

Furthermore, when the recording layers have the multilayer structure, the quality of a recording signal easily changes due to a slight difference of optical characteristics of the materials of the respective layers, mutual optical interference, etc., so that there is a possibility that the margin of the designing of the configurations of the recording layers is decreased in the case where crosstalk between the recording layers is controlled. The technique of the multiplication of layers is fundamental to achieve the high density recording, but no clear designing guidance is provided in the present situation, and no report has been found regarding a method of controlling the interlayer crosstalk due to the multiplication of layers.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary diagram explaining an example of setting general parameters in a recordable information storage medium;

FIG. 7 is an exemplary diagram explaining an example of the layout of physical sectors in the optical disc in FIG. 1;

FIG. 11 is an exemplary diagram explaining one example of physical format information in FIG. 10;

FIG. 12 is an exemplary diagram explaining one example of data area allocation in the physical format information in FIG. 11;

FIG. 13 is an exemplary diagram explaining an example of the configuration of a part (associated with L0) of the physical format information in FIG. 10;

FIG. 14 is an exemplary diagram explaining an example of the configuration of another part (associated with L1) of the physical format information in FIG. 10;

FIG. 15 is an exemplary diagram explaining an example of waveforms (write strategy) of recording pulses;

FIGS. 17A and 17B are exemplary diagrams explaining an example of contents of BCA record recorded in the BCA in FIG. 16;

in FIGS. 17A and 17B in the BCA;

FIG. 19 is an exemplary flowchart explaining one example of a procedure for recording the specific information (the BCA record, etc.) in an L1 layer of the recordable single-sided multilayer (dual-layer) optical disc in FIG. 16;

FIG. 20 is an exemplary flowchart explaining one example of a procedure for reproducing the specific information (the BCA record, etc.) from the L1 layer of the recordable single-sided multilayer (dual-layer) optical disc in FIG. 16.

DETAILED DESCRIPTION

Various embodiments according to the invention will be described hereinafter with reference to the accompanying drawings.

When information is recorded in an optical recording medium having a plurality of (e.g., two) recording layers, power of a light beam which has entered from a first recording layer (L0) is divided into two due to, for example, the presence of a light reflecting layer included in the first recording layer, and allocated to recording/playback for the first recording layer (L0) and recording/playback for a second recording layer (L1). Therefore, the light beam reduced by half has to be efficiently reflected in a light reflecting layer included in the second recording layer (L1). Thus, a high-reflectance material such as Ag or an Ag alloy is used to increase the reflectance. However, if the thickness of the light reflecting layer of the second recording layer (L1) is increased, the amount of reflection is increased, which increases an optical interference between the first recording layer (L0) and a recording signal. There is therefore a problem of significant deterioration in the quality of a recording/playback signal because of increased crosstalk between the first recording layer (L0) and the second recording layer (L1).

The embodiments of this invention solve such problems in examining recording characteristics of an optical recording medium having a plurality of (e.g., two) recording layers.

That is, one challenge of the embodiments of this invention is to provide an optical recording medium in which interlayer crosstalk is low and in which stable and high-quality recording characteristics can be obtained.

In the optical recording medium according to one embodiment of this invention, the material of the reflecting film and the thickness of the reflecting film are adjusted to optimize the reflectance of the light reflecting layer included in the second recording layer, such that the crosstalk between the first recording layer and the second recording layer is reduced, and the stable and high-quality recording characteristics are obtained. In other words, in the optical recording medium according to one embodiment of this invention having the first recording layer and the second recording layer in which information can be recorded/played back by light, the material and the thickness of the reflecting film of a light reflecting layer included in the second recording layer are adjusted.

Thus, in the multilayer recordable information recording medium, the occurrence of the interlayer crosstalk due to light applied to layers other than a desired layer is prevented when a laser beam is converged on the desired layer.

Figure 1:
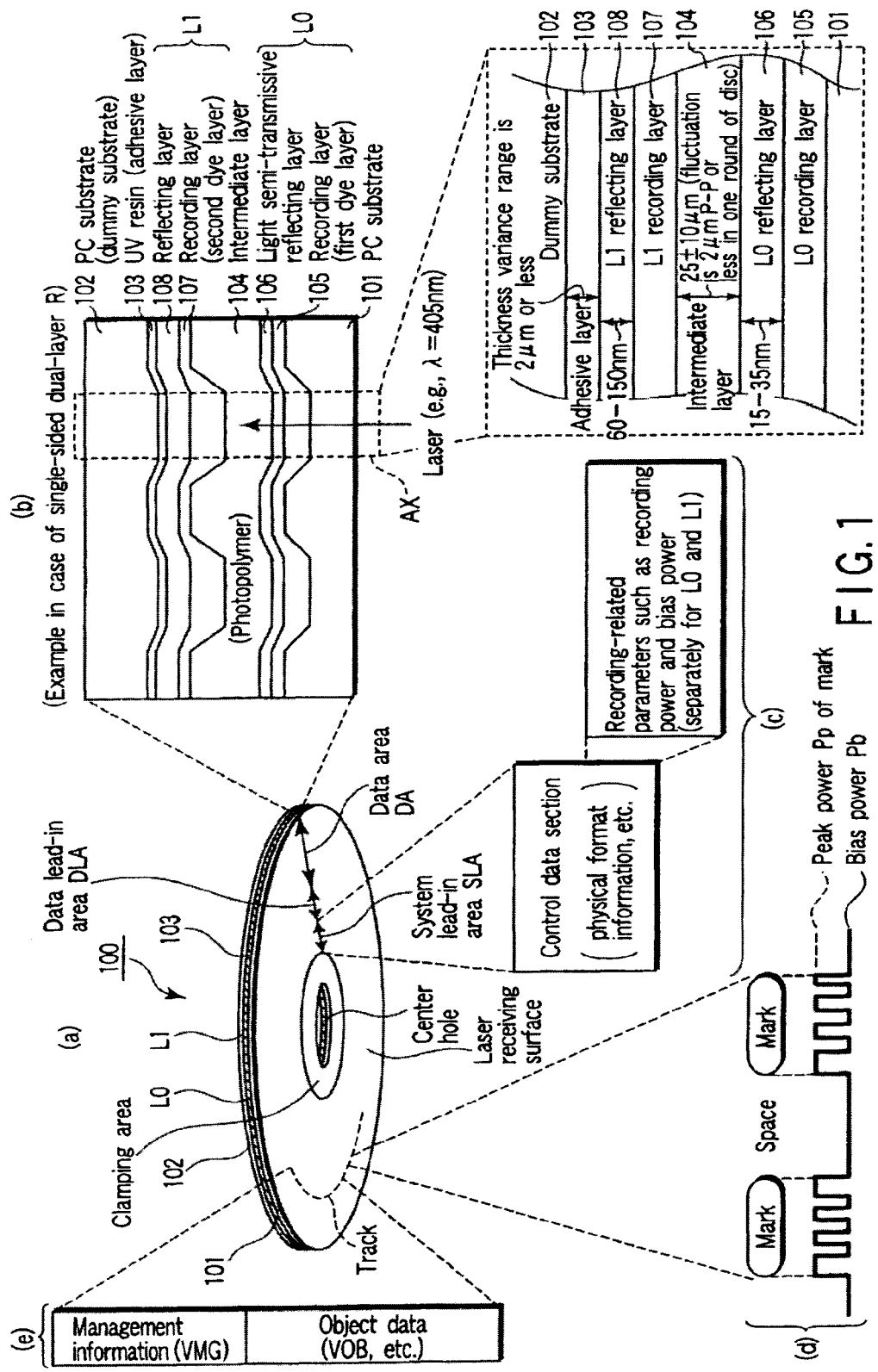
FIG. 1 is an exemplary diagram explaining an example of the configuration of a multilayer optical disc according to one embodiment of this invention.

FIG. 1 is a diagram explaining an example of the configuration of an optical disc (a recordable single-sided dual-layer optical disc as a concrete example) 100 according to the one embodiment. As illustrated in (a) and (b) in FIG. 1, this optical disc 100 comprises a transparent resin substrate 101 formed of a synthetic resin material such as polycarbonate (PC) to have a disc shape. A groove is concentrically or spirally formed in this transparent resin substrate 101. The transparent resin substrate 101 can be manufactured by injection molding using a stamper.

Here, an organic dye recording layer 105 and a light semi-transmissive reflecting layer 106 of a first layer (L0) are stacked in order on the transparent resin substrate 101 formed of, for example, polycarbonate and having a thickness of 0.59 mm, the top of which is spin-coated with a photopolymer (2P resin) 104. Then, the shape of a groove of a second layer (L1) is transferred onto the top of the photopolymer 104, and an organic dye recording layer 107 and a reflecting film 108 made of, for example, silver or a silver alloy are stacked thereon in order. To the stack of the recording layers of the L0 and L1, another transparent resin substrate (or a dummy substrate) 102 having a thickness of 0.59 mm is bonded via a UV curing resin (adhesive layer) 103. The organic dye recording film (the recording layers 105 and 107) has a dual-layer structure in which the semi-transmissive reflecting layer 106 and the intermediate layer 104 are interposed in between. A total thickness of the laminated optical disc finished in this manner is about 1.2 mm.

Here, on the transparent resin substrate 101, a spiral groove having, for example, a track pitch of 0.4 μm and a depth of 60 nm is formed (in the respective layers L0 and L1). This groove has a wobble, and address information is recorded on this wobble. The recording layers 105 and 107 containing an organic dye are formed on the transparent resin substrate 101 to fill the groove.

To form the recording layers 105 and 107, an organic dye can be used in which its maximum absorption wavelength region is shifted to a longer waveform side than a recording wavelength (e.g., 405 nm). Moreover, absorption is not vanished in a recording wavelength region, and its long wavelength region (e.g., 450 nm to 600 nm) is designed to also absorb a significant amount of light.

The organic dye (a concrete example of which will be described later) is dissolved in a solvent and liquefied, and can thus be easily applied to the surface of the transparent resin substrate by a spin coat method. In this case, the rate of dilution with the solvent and the number of revolutions during the spin coat are controlled so that the film thickness can be managed with high accuracy.

In addition, light reflectance is low when a recording laser beam is focused on or tracking is performed on a track before the recording of information. Then, the decomposition and reaction of the dye are induced by the laser beam, and light reflectance in a recording mark portion increases due to a decrease in the optical absorptance of the dye. Thus, so-called Low-to-High (or L to H) characteristics are achieved wherein the light reflectance in the recording mark portion formed by the application of the laser beam becomes higher than light reflectance before the application of the laser beam.

In this one embodiment, physical formats applied to the L0 layer and the L1 layer present on the transparent resin substrate 101 and the photopolymer (2P resin) 104 are as described below. That is, general parameters of the recordable single-sided dual-layer disc are about the same as general parameters of a single-layer disc, but are different in the following points. A recording capacity available to a user is 30 GB, the inside radius of a data area is 24.6 mm in the layer 0 (L0 layer) and 24.7 mm in the layer 1 (L1 layer), and the outside radius of the data area is 58.1 mm (both in the layer 0 and the layer 1).

In the optical disc 100 in FIG. 1(a), a system lead-in area SLA includes a control data section as illustrated in FIG. 1(c), and this control data section contains parameters regarding the recording of recording power (peak power), bias power, etc. as part of physical format information, etc., separately for the L0 and L1.

Furthermore, mark/space recording is carried out in a track within a data area DA of the optical disc 100 by laser containing predetermined recording power (peak power) and bias power, as illustrated in FIG. 1(d). Owing to this mark/space recording, object data (VOB, etc.) for, for example, a high-definition TV broadcast program, and its management information (VMG) are recorded on the tracks (of the L0 and/or L1) within the data area DA, as illustrated in FIG. 1(e).

Organic dyes that can be used in this one embodiment include, for example, cyanine dyes, styryl dyes, azo dyes, etc. The cyanine dyes and the styryl dyes are particularly preferable because they allow easy control on their absorptance with respect to a recording wavelength. Moreover, the azo dyes may be used in the form of a single azo compound, or in the form of a complex of one or more molecules of the azo compound and a metal.

An azo metal complex that can be used in this one embodiment uses cobalt, nickel or copper as its central metal M in order to have higher photostability. However, the central metal M of the azo metal complex that can be used is not limited to these metals, and may be scandium, yttrium, titanium, zirconium, hafnium, vanadium, niobium, tantalum, chromium, molybdenum, tungsten, manganese, technetium, rhenium, iron, ruthenium, osmium, rhodium, iridium, palladium, platinum, silver, gold, zinc, cadmium, mercury, etc.

The azo compound has an aromatic ring, and not only the structure of the aromatic ring but also the provision of the aromatic ring with various substituents permits the optimization of recording characteristics, saving characteristics, playback characteristics, etc. The bulkier substituents tend to have an improvement in playback light resistance, but also tend to have lower sensitivity in recording, so that the selection of a substituent satisfactory in both of these characteristics is fundamental. Moreover, this substituent is concerned with the solubility into a solvent.

Unlike recording mechanisms of conventional dye-based information recording media (whose recording laser wavelengths are longer than 620 nm), the recording mechanism of short-wavelength laser recording (whose recording wavelength is, for example, 405 nm) related to this application is not based on physical changes in a substrate and the volume of a dye film. During playback, the orientation of dye molecules within the recording layers or the conformation in the dye molecules is gradually changed by heat or light due to the application of laser weaker than that during recording to the dye, but the presence of the bulky substituent in the dye molecules is considered to have the effect of preventing such changes from being easily caused. This is why the bulky substituent contributes to the improvement of the playback light resistance.

The bulky substituent at this point means a substituent composed of three or more carbons substituted for the aromatic rings in the dye molecules, and includes an n-propyl group, an isopropyl group, an n-butyl group, a 1-methyl propyl group, a 2-methyl propyl group, an n-pentyl group, a 1-ethyl propyl group, a 1-methyl butyl group, a 2-methyl butyl group, a 3-methyl butyl group, a 1,1-dimethyl propyl group, a 1,2-dimethyl propyl group, a 2,2-dimethyl propyl group, a cyclopentyl group, an n-hexyl group, a 1-methyl pentyl group, 2-methyl pentyl group, a 3-methyl pentyl group, a 4-methyl pentyl group, a 1,1-dimethyl butyl group, a 1,2-dimethyl butyl group, a 1,3-dimethyl butyl group, a 2,2-dimethyl butyl group, a 2,3-dimethyl butyl group, a 3,3-dimethyl butyl group, a 1-ethyl butyl group, a 2-ethyl butyl group, a cyclohexyl group, a phenyl group, etc. Here, the substituent may contain atoms other than carbon, such as oxygen, sulfur, nitrogen, silicon, fluorine, bromine, chlorine and iodine.

In the configuration example of FIG. 1(b), the thickness of each layer within an area AX which the laser beam enters is, for example, as shown in FIG. 1. That is, in this example, the thickness of the L0 reflecting layer 106 of Ag or an Ag alloy is selected within a range of 15 nm to 35 nm, and the thickness of the L1 reflecting layer 108 of Ag or an Ag alloy is selected within a range of 60 nm to 150 nm (i.e., the thickness of the L1 reflecting layer>the thickness of the L0 reflecting layer). Moreover, the thickness of the intermediate layer 104 is selected within a range of 25±10 μm, and the adhesive layer 103 is managed so that the range of its variation may be 2 μm or less.

Figure 2:
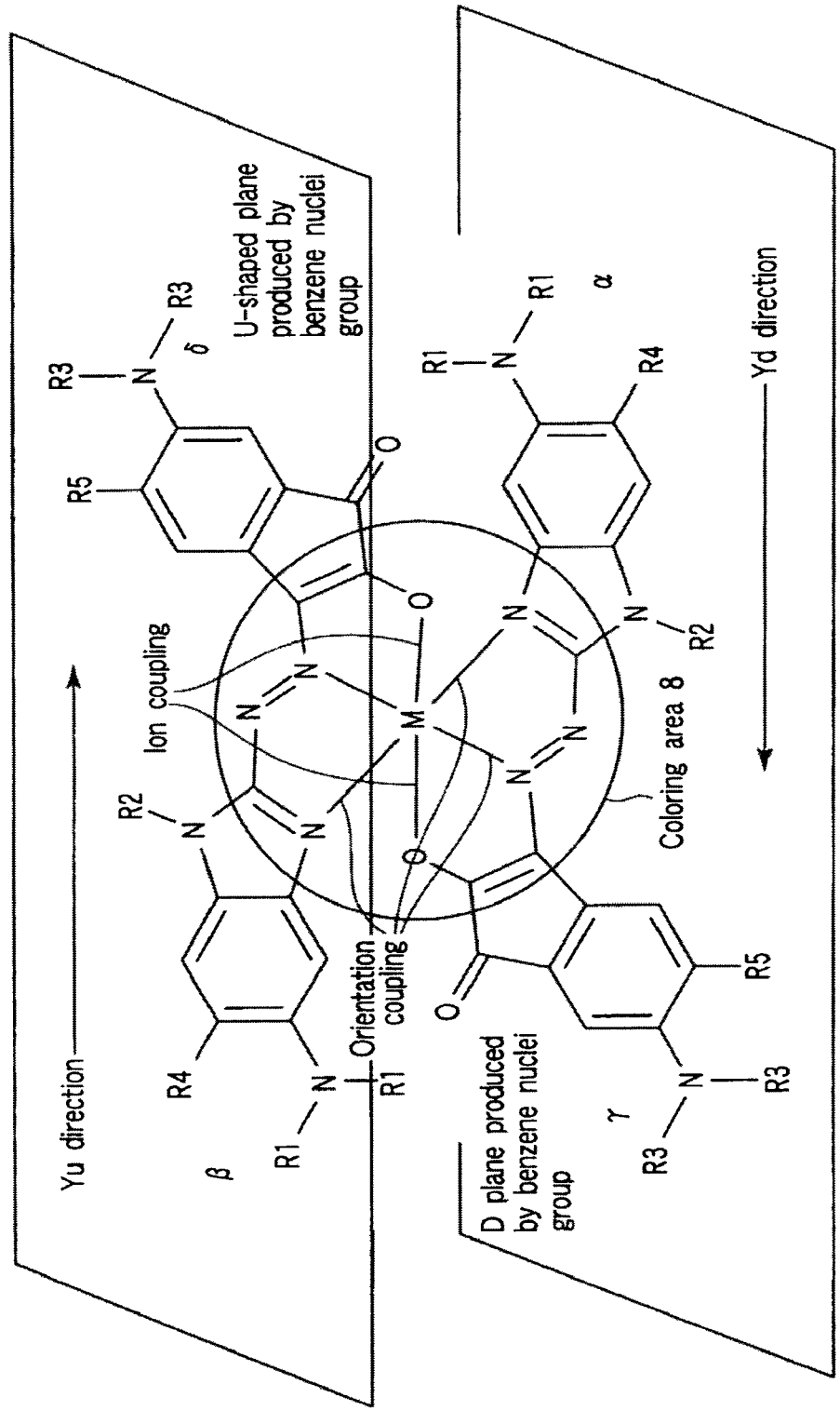
FIG. 2 is an exemplary diagram showing a concrete example of a metal complex portion of an organic material for a recording layer.

FIG. 2 is a diagram showing a concrete example of a metal complex portion of an organic material for the recording layer. A circular peripheral region around the central metal M of the shown azo metal complex is a coloring area 8. When the laser beam passes through this coloring area 8, localized electrons in this coloring area 8 resonate with a change of the electric field of the laser beam, and absorb the energy of the laser beam. When the frequency of the electric field change at which the localized electrons resonate most and easily absorb the energy is converted to the wavelength of the laser beam, a resulting value is indicated by a maximum absorption wavelength λmax. A longer length of the coloring area 8 (resonance range) as shown in the drawing shifts the maximum absorption wavelength λmax to the longer waveform side. Moreover, the replacement of the atoms of the central metal M changes the localization range of the localized electrons around the central metal M (how much the central metal M can attract the localized electrons to the vicinity of the center), and the value of the maximum absorption wavelength λmax changes. For example, if a selection is made so that the λmax may be about 405 nm, an organic material sensitive (light absorption) to a wavelength of 405 nm can be obtained.

As the dye material for the recording layer (e.g., the L0 or L1) having the light absorption at a wavelength of 405 nm, an organic dye material can be used whose general structural formula is shown in FIG. 2 and which has a structure combining an organic metal complex portion an unshown dye material portion. As the central metal M of the organic metal complex, cobalt or nickel (or, for example, scandium, yttrium, titanium, zirconium, hafnium, vanadium, niobium, tantalum, chromium, molybdenum, tungsten, manganese, technetium, rhenium, iron, ruthenium, osmium, rhodium, iridium, palladium, platinum, copper, silver, gold, zinc, cadmium, mercury, etc.) can be used. Moreover, although not shown in the drawing, cyanine dyes, styryl dyes, monomethinecyanine dyes can be used as the dye material portion.

Here, a recording principle interpreted in current DVD-R discs will be described. In the current DVD-R disc, when the laser beam is applied to the recording film, the recording layer locally absorbs the energy of the laser beam and have high heat. Beyond a particular temperature, the transparent substrate locally deforms. While the mechanism which induces the deformation of the transparent substrate is different depending on the manufactures of the DVD-R discs, the causes are said to be:

(1) the local plastic deformation of the transparent substrate due to evaporation energy of the recording layer, and/or (2) the local plastic deformation of the transparent substrate due to heat transmitted from the recording layer to the transparent substrate. The local plastic deformation caused in the transparent substrate changes the optical distance of the laser beam which returns after passing through the transparent substrate, being reflected by the light reflecting layer and again passing through the transparent substrate. A phase difference is produced between the laser beam from within the recording mark which returns after passing through the locally plastically deformed portions of the transparent substrate, and the laser beam from portions around the recording mark which returns after passing through the non-deformed portions of the transparent substrate. Thus, the amount of reflected light changes due to the interference between these laser beams. Moreover, particularly when the above-mentioned mechanism of (1) is produced, a substantial change of a refractive index $n_{32}$ caused by the hollowing within the recording mark of the recording layer due to evaporation (vaporization), or a change of the refractive index $n_{32}$ caused by the thermal decomposition of the organic dye recording material within the recording mark also contributes to the production of the phase difference. In the current DVD-R disc, the recording layer has to be at a high temperature (an evaporation temperature of the recording layer in the above-mentioned mechanism of (1), or a temperature in the recording layer needed for the plastic deformation of the transparent substrate in the mechanism of (2)) until the transparent substrate locally deforms, and the recording layer also has to be at a high temperature to thermally decompose or evaporate (vaporize) part of the recording layer. Therefore, high power of the laser beam is needed to form the recording mark.

As the first stage for forming the recording mark, the recording layer has to be able to absorb the energy of the laser beam. A light absorption spectrum in the recording layer greatly influences the recording sensitivity of the organic dye recording film.

FIG. 2 shows a concrete structural formula of a concrete contents "azo metal complex+Cu" of the components of the information storage medium described above. The circular peripheral region around the central metal M of the azo metal complex shown in FIG. 2 is the coloring area 8. When the laser beam passes through this coloring area 8, localized electrons in this coloring area 8 resonate with a change of the electric field of the laser beam, and absorb the energy of the laser beam. When the frequency of the electric field change at which the localized electrons resonate most and easily absorb the energy is converted to the wavelength of the laser beam, a resulting value is referred to as the maximum absorption wavelength, and indicated by $\lambda_{max}$. A longer length of the coloring area 8 (resonance range) as shown in FIG. 2 shifts the maximum absorption wavelength $\lambda_{max}$ to the longer waveform side. Moreover, the replacement of the atoms of the central metal M in FIG. 2 changes the localization range of the localized electrons around the central metal M (how much the central metal M can attract the localized electrons to the vicinity of the center), and the value of the maximum absorption wavelength $\lambda_{max}$ changes.

Figure 3:
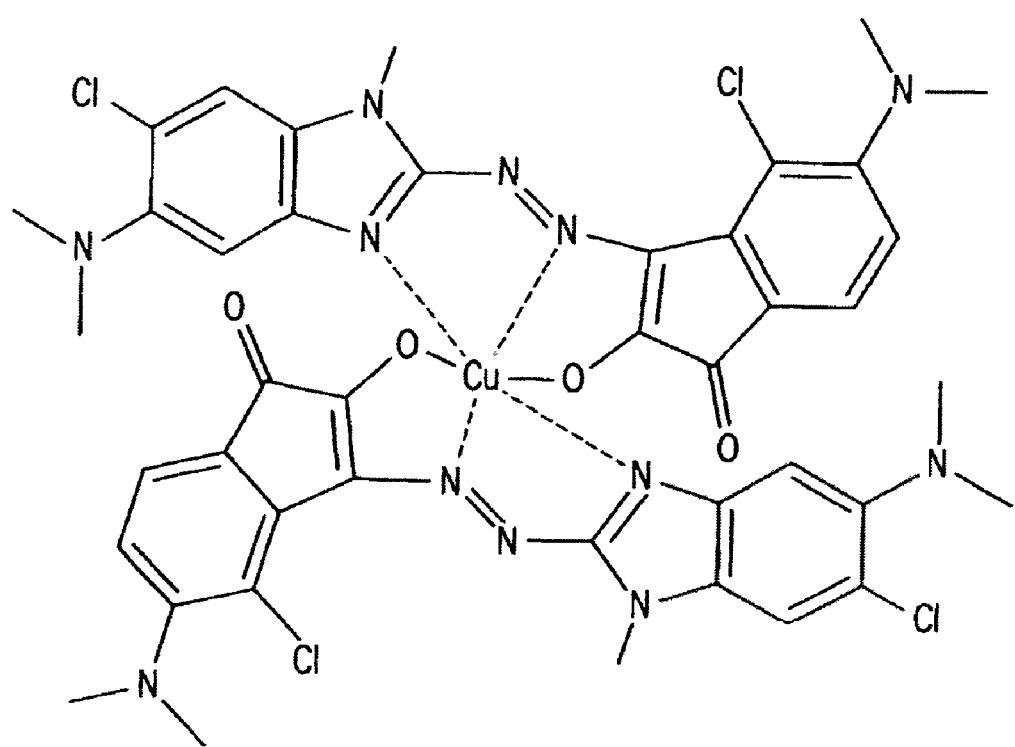
FIG. 3 is an exemplary diagram showing one example of a dye portion of the organic material for the recording layer.

The optical disc 100 using a dye indicated by a chemical formula in FIG. 3 was manufactured, and information recording was performed for random data. When an error rate SbER of the L0 layer was measured, 5.4e-6 could be obtained which was a satisfactory value lower enough than a target value of 5.0e-5 (higher than a practical level). Further, when a repeated pattern with a 11T mark and a 11T space was recorded and then played back, almost no distortion of a waveform was observed, and a difference between a maximum value and a minimum value of I11L ([I11Lmax−I11Lmin]/I11min) which was a space level (when the 11T space was played back) was 2%. Here, the length of the 11T mark was 1.12 μm, and 1.2*Na/λ was 0.74 μm, resulting in a sufficiently long mark. While IR, MS and NMR before and after recording were analyzed regarding this dye, no difference was found.

<<General Parameters>>

General parameters of a recordable single-sided dual-layer disc compared with a recordable single-sided single-layer disc are shown in FIG. 4. The general parameters of the recordable single-sided dual-layer disc are about the same as the general parameters of the single-layer disc, but are different in the following points. In the recordable single-sided dual-layer disc, a recording capacity available to a user is 30 GB, the internal radius of a data area is 24.6 mm in the layer 0 and 24.7 mm in the layer 1, and the outside radius of the data area is 58.1 mm (both in the L0 and the L1).

Figure 5:
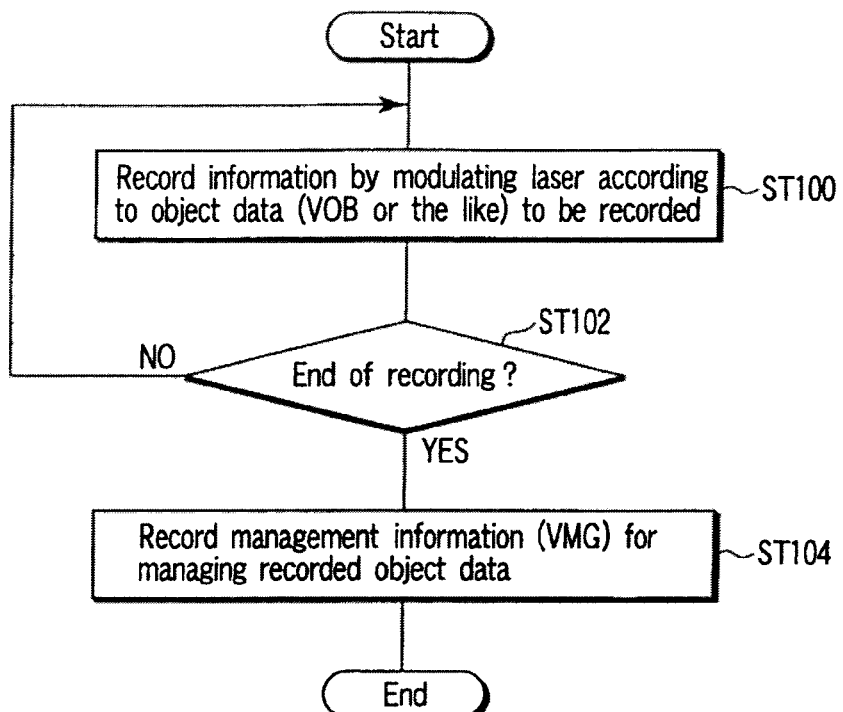
FIG. 5 is an exemplary flowchart explaining a recording method using the optical disc according to the one embodiment of this invention.

FIG. 5 is a flowchart explaining a recording method using the optical disc according to the one embodiment. Modulated laser having a wavelength of, for example, 405 nm is applied to a recording target layer (L0 or L1) of the disc 100 from an optical pickup of an unshown disc drive, thereby recording object data (VOB, etc., in DVDs or HD_DVDs) (ST 100). After the completion of this recording (ST 102Y), management information on the recorded object data (VMG, etc. in DVDs or HD_DVDs) is written in the disc 100 (ST 104), such that one recording is finished.

Figure 6:
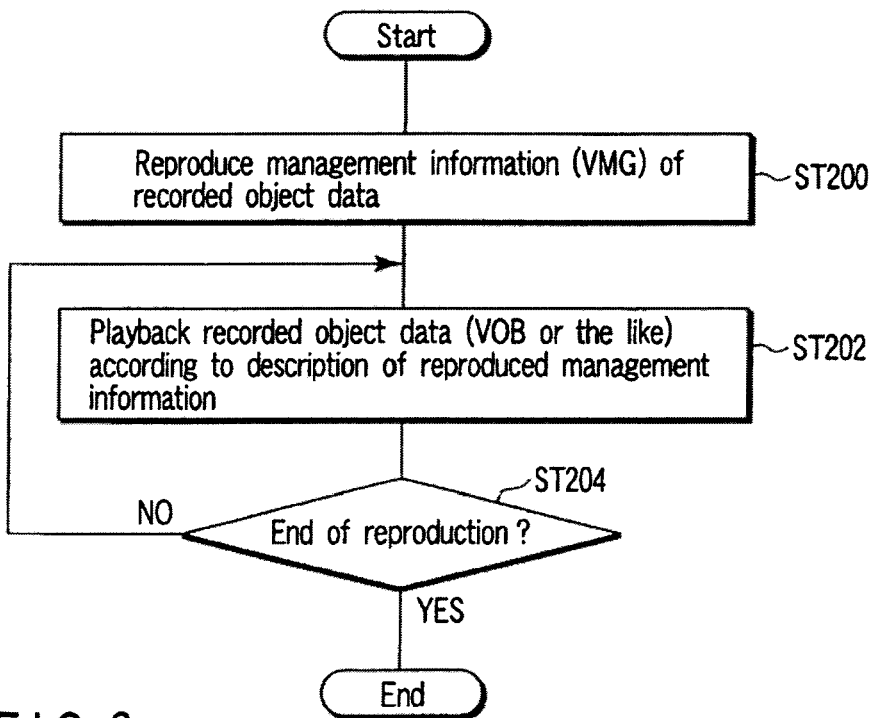
FIG. 6 is an exemplary flowchart explaining a reproducing method using the optical disc according to the one embodiment of this invention.

FIG. 6 is a flowchart explaining a playback method using the optical disc according to the one embodiment. The management information is read by laser having a wavelength of, for example, 405 nm from the disc 100 in which the object data and the management information are recorded in the processing as in FIG. 5 (ST 200). The read management information is temporarily stored in a work memory of an unshown playback device. This playback device plays back the recorded object data with reference to information on a playback procedure in the stored management information, etc. (ST 202). This playback terminates when the user instructs to terminate the playback or when the playback has reached a point where the playback procedure information within the management information indicates the termination of the playback (ST 204Y).

FIG. 7 is a diagram explaining one example of the layout of physical sectors in the optical disc 100 in FIG. 1. As shown in FIG. 7, an information area provided over the two layers comprises 7 areas: a system lead-in area, a connection area, a data lead-in area, a data area, a data lead-out area, a system lead-out area and a middle area. The middle area is provided in each layer, such that a playback beam can be moved from the layer 0 (L0) to the layer 1 (L1). The data area DA records main data (the management information VMG, the object data VOB, etc. in the example of FIG. 1(*e*)). The system lead-in area SLA includes control data, reference codes, etc. The data lead-out area permits smooth sequential reading.

<<Lead-Out Area>>

The system lead-in area and the system lead-out area include tracks including emboss pits. The data lead-in area, the data area and the middle area in the layer 0 (L0), and the middle area, the data area and the data lead-out area in the layer 1 (L1) include a groove track. The groove track is continuous from the start position of the data lead-in area to the end position of the middle area in the layer 0, and continuous from the start position of the middle area to the end position of the data lead-out area in the layer 1. In addition, if a pair of single-sided dual-layer disc substrates is prepared and bonded together, a double-sided four-layer disc having two reading surfaces is produced.

Figure 8:
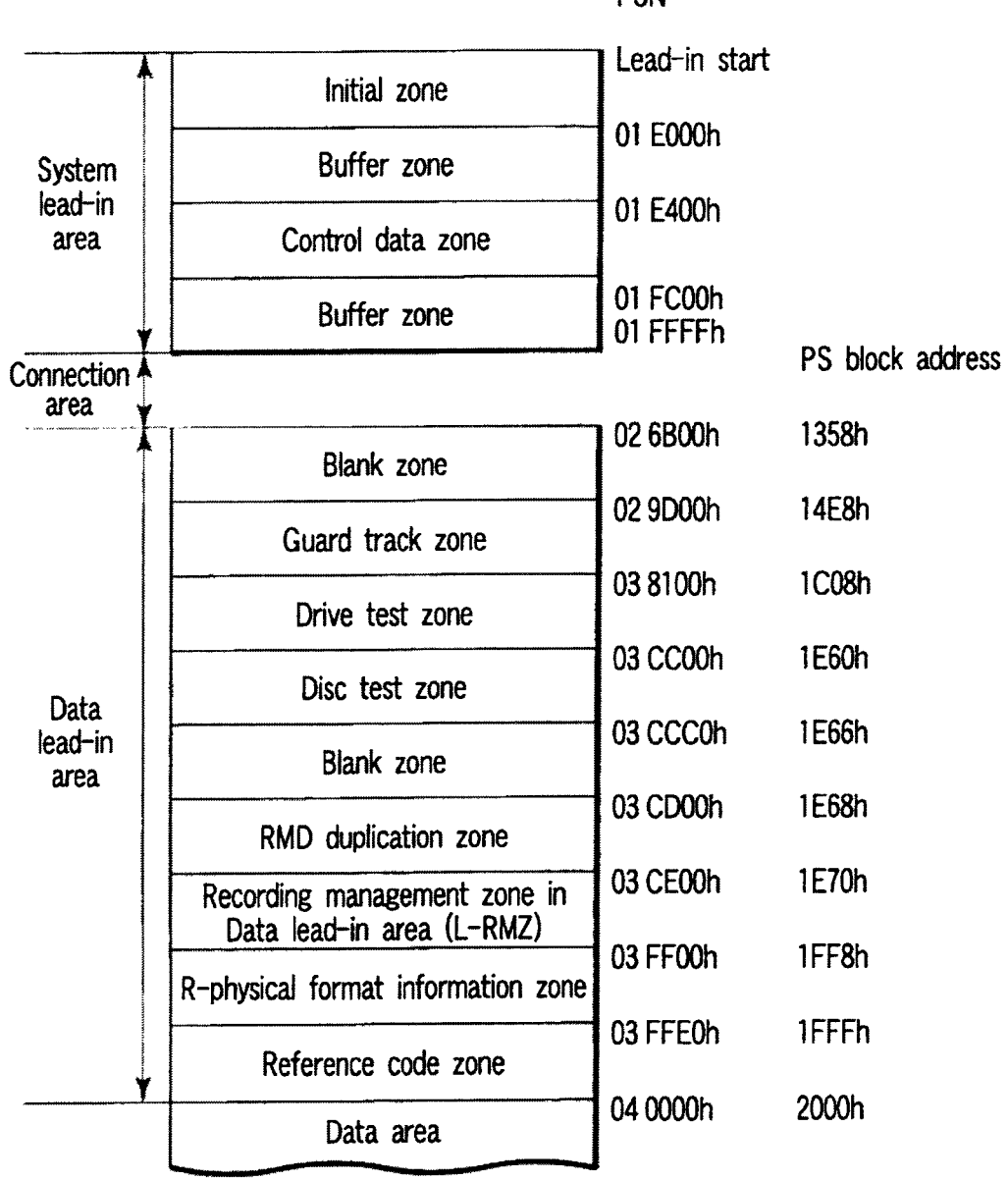
FIG. 8 is an exemplary diagram explaining an example of the configuration of a lead-in area in the optical disc in FIG. 1.

FIG. 8 is a diagram explaining an example of the configuration of the lead-in area in the optical disc in FIG. 1. As shown in FIG. 8, the system lead-in area SLA in the layer 0 (L0) is composed of an initial zone, a buffer zone, a control data zone and a buffer zone in order from the inner peripheral side. The data lead-in area in the layer 0 is composed of a blank zone, a guard track zone, a drive test zone, a disc test zone, a blank zone, a recording management data (RMD) duplication zone, an L-RMZ (recording position management data), an R-physical format information zone and a reference code zone in order from the inner peripheral side. A start address (inner peripheral side) of the data area in the layer 0 (L0) is different by a clearance from an ending address (inner peripheral side) of the data area in the layer 1, and the ending address (inner peripheral side) of the data area in the layer 1 (L1) is closer to the outer peripheral side than the start address (inner peripheral side) of the data area in the layer 0.

<<Structure of Lead-In Area>>

FIG. 8 illustrates the structure of the lead-in area in the layer 0 (L0). In the system lead-in area, there are arranged, in order from the inner peripheral side, the initial zone, the buffer zone, the control data zone and the buffer zone. In the data lead-in area, there are arranged, in order from the inner peripheral side, the blank zone, the guard track zone, the drive test zone, the disc test zone, the blank zone, the RMD duplication zone, the recording position management (recording management) zone (L-RMZ) within the data lead-in area, the R-physical format information zone and the reference code zone.

<<Details of System Lead-In Area>>

The initial zone includes an embossed data segment. The main data in a data frame recorded as a data segment of the initial zone is set at "00h". The buffer zone is constituted of 1024 physical sectors of 32 data segments. The main data in a data frame recorded as a data segment of this zone is set at "00h". The control data zone includes an embossed data segment. The data segment includes embossed control data. The control data is constituted of 192 data segments originating at PSN 123904(01 E400h).

Figure 9:
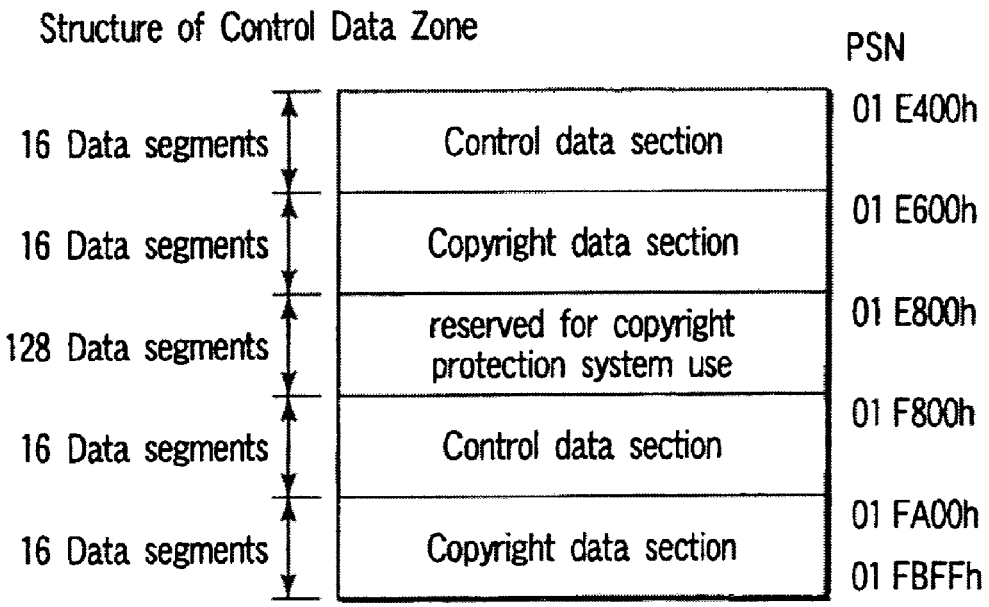
FIG. 9 is an exemplary diagram explaining an example of the configuration of a control data zone in FIG. 8.
Figure 10:
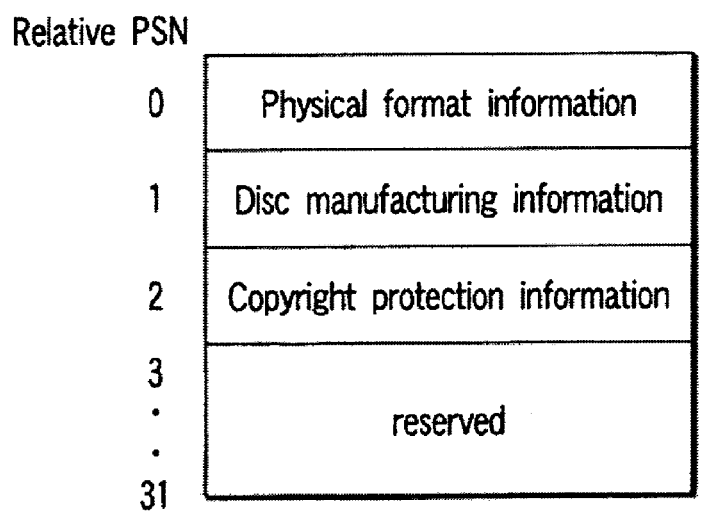
FIG. 10 is an exemplary diagram explaining the example of the configuration in FIG. 9.

An example of the configuration of the control data zone is shown in FIG. 9. Moreover, an example of the configuration of the data segment in the control data section is shown in FIG. 10. The contents of the first data segment in the control data section are repeated sixteen times. The first physical sector in each data segment includes physical format information. The second physical sector in each data segment includes disc manufacturing information. The third physical sector in each data segment includes copyright protection information. The contents of the other physical sectors in each data segment serve as reserve areas for system use.

FIG. 11 is a diagram explaining one example of the physical format information in the control data section. FIG. 12 is a diagram explaining one example of data area allocation in the physical format information. The contents written in byte positions (BPs) in this physical format information are as follows: values of read power, recording velocities, the reflectance of the data area, push-pull signals and on-track signals shown from BP132 to BP154 are illustrative. Actual values for these can be selected by a disc manufacturer from values that satisfy rules for emboss information and rules for characteristics of user data after recorded. The contents of the data area allocation written in BP4 to BP15 are as shown in, for example, FIG. 12.

BP149 and BP152 in FIG. 11 specify the reflectance of the data areas in the layer 0 and the layer 1. For example, 0000 1010b indicates 5%. Actual reflectance is specified by the following equation:

Actual reflectance=value×(½).

BP150 and BP153 specify the push-pull signals of the layer 0 and the layer 1. In each of these BPs, an unshown bit b7 specifies the shape of the track of the disc in each layer, and unshown bits b6 to b0 specify the amplitudes of the push-pull signals:

Track shape: 0b (track on groove)
1b (track on land)
Push-pull signal: for example, 010 1000b indicates 0.40.
The actual amplitude of the push-pull signal is specified by the following equation:

Actual amplitude of push-pull signal=value×(1/100).

BP151 and BP154 specify the amplitudes of the on-track signals in the layer 0 and the layer 1:

On-track signal: for example, 0100 0110b indicates 0.70.
The actual amplitude of the on-track signal is specified by the following equation:

Actual amplitude of on-track signal=value×(1/100).

In addition, recording-related parameters of the L0 as illustrated in FIG. 13 can be written in BP512 to BP543 of the physical format information, and information on initial peak power, bias power, etc. in recording in the L0 layer can be taken from the description in FIG. 13. Moreover, recording-related parameters of the L1 as illustrated in FIG. 14 can be written in BP544 to BP2047 of the physical format information, and information on initial peak power, bias power, etc. in recording in the L1 layer can be taken from the description in FIG. 14.

Explanation of Recording Conditions (Information on Write Strategy)

A recording waveform used when the optimum recording power is examined (exposure conditions during recording) will be described using FIG. 15. Exposure levels during recording include four levels: recording power (peak power), bias power 1, bias power 2, and bias power 3. In forming a long recording mark 9 (4T or more), modulation in a multi-pulse form is performed between the recording power (peak power) and the bias power 3. In this embodiment, the minimum mark length for a channel bit length T is 2T in both an "H format" and a "B format". When the minimum mark of 2T is recorded, one light pulse at the recording power (peak power) level is used after the bias power 1, and the bias power 2 once comes immediately after the light pulse, as shown in FIG. 15. When a recording mark 9 having a length of 3T is recorded, exposure is performed for two light pulses including a first pulse at the recording power (peak power) level coming after the bias power 1 and a light pulse, and then the bias power 2 comes once. When a recording mark 9 having a length of 4T or more is recorded, exposure is performed at multi-pulses and the light pulse, and the bias power 2 comes.

Vertical broken lines in FIG. 15 indicate channel clock cycles (T). When the minimum mark of 2T is recorded, the pulse rises at a position delayed for $T_{SFP}$ from a clock edge, and falls at a position behind $T_{ELP}$ from an edge after one clock. A period immediately thereafter in which the bias power 2 comes is defined as $T_{LC}$. The values of $T_{SFP}$, $T_{ELP}$ and $T_{LC}$ are recorded in physical format information PFI within a control data zone CDZ in the case of the H format.

In the case of forming a long recording mark 9 of 3T or more, the pulse rises at a position delayed for $T_{SFP}$ from the clock edge, and ends in a last pulse. The bias power 2 comes during $T_{LC}$ immediately after the last pulse, and lag times from the clock edge corresponding to the timings of the rising/falling of the last pulse are defined as $T_{SLP}$ and $T_{ELP}$. Moreover, time measured from the clock edge corresponding to the timing of the falling of a head pulse is defined as $T_{EFP}$, and the interval of one multi-pulse is defined as $T_{MP}$.

Each of the interval between $T_{ELP}$ and $T_{SFP}$, the interval of $T_{MP}$, the interval between $T_{ELP}$ and $T_{SLP}$, and the interval of $T_{LC}$ is defined by a half value width with respect to the maximum value. Further, in this embodiment, set ranges of the parameters described above are:

$$0.25T \leq T_{SFP} \leq 1.50T \quad \text{(eq.01)}$$

$$0.00T \leq T_{ELP} \leq 1.00T \quad \text{(eq.02)}$$

$$1.00T \leq T_{EFP} \leq 1.75T \quad \text{(eq.03)}$$

$$-0.10T \leq T_{SLP} \leq 1.00T \quad \text{(eq.04)}$$

$$0.00T \leq T_{LC} \leq 1.00T \quad \text{(eq.05)}$$

$$1.50T \leq T_{MP} \leq 0.75T \quad \text{(eq.06)}.$$

Furthermore, in this embodiment, the values of the parameters described above can be changed depending on a mark length and a leading/trailing space length.

When the optimum recording power of the recordable information recording medium for which recording is performed in accordance with the recording principle shown in this embodiment is examined, the values of the parameters including the bias power 1, the bias power 2 and the bias power 3 are 2.6 mW, 1.7 mW and 1.7 mW, respectively, and playback power is 0.4 mW.

On the basis of the values, etc. of the parameters calculated as described above, "recording conditions (information on the write strategy) optimum for a storage medium in a device (drive) in which test writing has been performed on the storage medium in its drive test zone" can be determined.

Furthermore, the repeated pattern having the 11T mark and the 11T space has been used as data for the recording signal in addition to the data described above. Physical formats present on the recording layers (L0 and L1) on the transparent resin substrate 101 and the photopolymer 104 resin used in the embodiment described above are as described with reference to FIG. 7 to FIG. 15.

Figure 16:
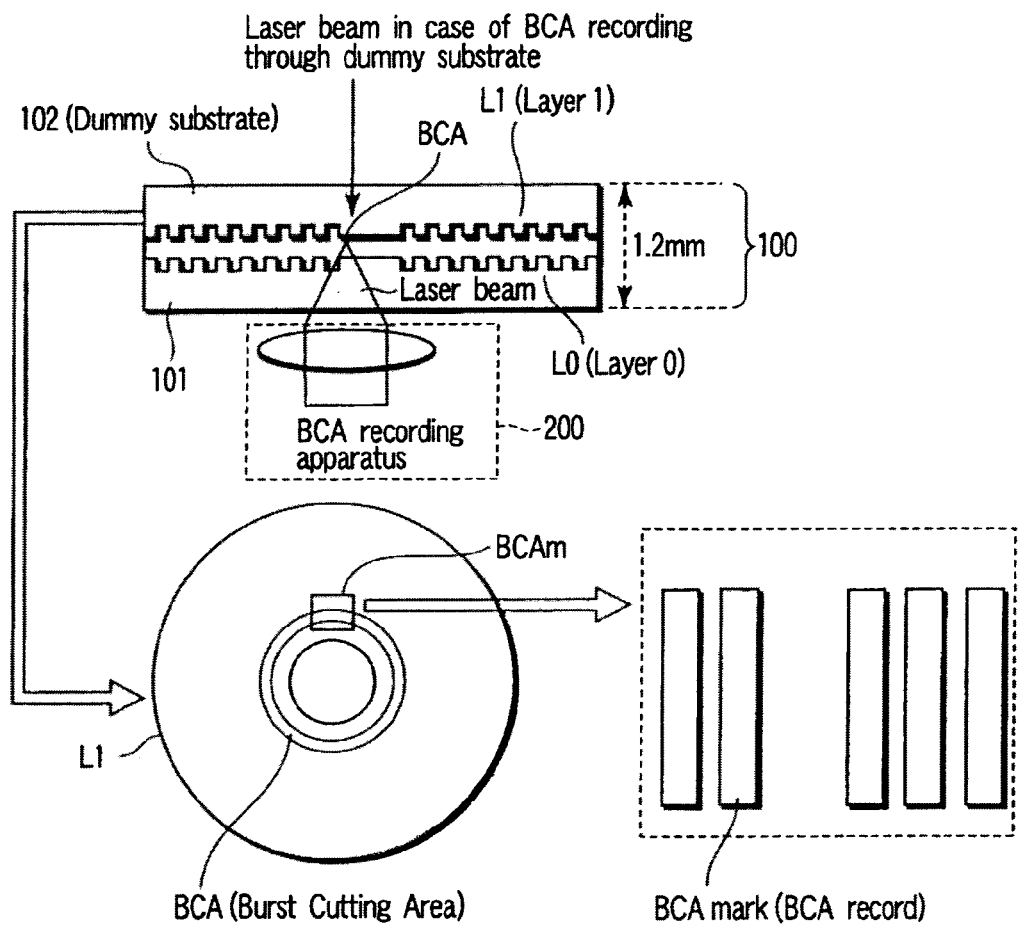
FIG. 16 is an exemplary diagram explaining the formation of a burst cutting area (BCA) on an L1 layer of a recordable single-sided multilayer (dual-layer) optical disc according to the one embodiment of this invention.

FIG. 16 is a diagram explaining the formation of a burst cutting area (BCA) on the L1 layer of the recordable single-sided multilayer (dual-layer) optical disc according to the one embodiment. Here, the L0 layer is provided on the substrate 101 on a laser receiving side, the L1 layer is provided opposite to the L0 layer, and the substrate 102 is disposed on the L1 layer, thereby forming the laminated dual-layer disc 100 having a substrate thickness of 1.2 mm. The burst cutting area (BCA) in which information unique to the disc is recorded in a bar-code-shaped pattern (mark) is provided on the L1 layer on the inner peripheral side of the disc 100.

Information unique to the disc is preferably recorded in advance on the individual optical disc at the time of its manufacture. The information unique to the disc recorded at this point is used, for example, when the individual disc has to be identified for copy protection. In optical discs such as a CD, a DVD, a BD, and an HD_DVD, such information (BCA records, etc.) unique to the disc is inscribed in advance as the bar-code-shaped pattern called the BCA in an inner peripheral portion of the disc (see BCAm in FIG. 16). At this point, in the case of a playback-only dual-layer optical disc, such information is generally recorded in a layer located on a far side when viewed from an entrance surface of recording/playback light.

Recently, single-sided dual-layer optical discs have been developed in recording-type optical discs rather than the playback-only optical discs in response to a desire for higher capacity in the optical disc. In order to be compatible with the playback-only discs, it is also preferable in the recording-type dual-layer optical discs that the BCA signal be recorded in the layer located on the far side when viewed from the entrance surface of the recording/playback light. However, there are some problems associated with this. A method of recording the BCA will be described below, and the problems in the case of the dual layer will be mentioned.

One method of providing the BCA in the disc is to inscribe the pattern of the BCA in a stamper serving as a mold when the optical disc is molded. However, the BCA pattern has to be inscribed in the produced disc by, for example, a laser beam in order to record individual unique information on each disc. In general, when the BCA is recorded on the playback-only disc, the pattern is produced by burning off the reflecting film (aluminum, silver, or an alloy thereof) with laser. Moreover, when the BCA is recorded on a phase-change recording disc, the pattern is produced by causing a phase change in the recording film with laser to change its reflectance.

On the other hand, in the case of the recordable optical disc using the organic dye material, the sensitivity of the dye is significantly high to the wavelength, so that the BCA pattern can not be satisfactorily recorded even if a current BCA recording apparatus which uses laser having a long wavelength (e.g., 650 nm, 680 nm or 780 nm) is applied to the next-generation optical disc (e.g., the BD or HD_DVD) using the dye conforming to a short wavelength (e.g., 405 nm). In this case, laser power of the BCA recording apparatus could be strengthened, or the laser wavelength of the BCA recording apparatus could be changed to correspond to a data recording wavelength (e.g., 405 nm). However, since the information on the BCA is recorded in the far layer (L1) through the near layer (L0), the dye of the near layer also reacts in this method coupled with the fact that the focal depth of the BCA recording apparatus is extremely large (or that BCA recording light is parallel light). This results in noise (an interlayer crosstalk signal) during the playback of the BCA signal.

Therefore, in this embodiment, an organic metal used is selected so that the recording sensitivity to a wavelength B is higher in the far layer (L1) in which the BCA is recorded than in the near layer (L0) in which the BCA is not recorded, where A (nm) is a wavelength used for the recording/playback of data, and B is the wavelength of the BCA recording apparatus. A dye conforming to the wavelength of the BCA recording apparatus as well is used in the far layer (L1) alone (e.g., two kinds of dyes with difference sensitivities are mix, such as a dye sensitive to about 405 nm and a dye sensitive to about 650 nm to 780 nm) while a wavelength used for the recording of actual data (such as high-definition video data encoded by MPEG4AVC) is separated from a wavelength used for the recording of the BCA information (A≠B), such that the BCA signal can be selectively recorded in the far layer (L1) alone.

This embodiment illustrates a recordable optical disc which has a diameter of 120 mm and a thickness of 1.2 mm (two polycarbonate molded substrates of 0.6 mm bonded together) and which has two recording layers using the organic dye material. An optical system adapted to a wavelength ($\lambda$) of 405 nm and a numerical aperture (NA) of 0.65 is used for the recording/playback light. An inter-groove track pitch in a data recording area is, for example, 400 nm, and the position of the BCA area is at, for example, a radius of 22.2 mm to 23.1 mm. Moreover, the BCA pattern is formed of a bar-code-shaped pattern having, for example, a width (in a tangential direction) of several ten μm and a (diametrical) length of about several hundred μm.

In addition, this embodiment is not limited to the illustration described above. For example, an optical disc whose surface is provided with a cover layer of 0.1 mm may be used, an optical disc having a diameter of 80 mm may be used, a higher density track pitch pattern may be used, laser having a shorter wavelength (e.g., λ is 400 nm or less) may be used, and an optical system (objective lens) adapted to a higher numerical aperture (e.g., an NA of 0.8 to 0.9) may be used.

Concrete examples of materials for the recordable multilayer optical disc according to the one embodiment are as follows: polycarbonate for the molded substrates; nickel (Ni) for the stamper used for molding; an organic dye material made of an azo, diazo, cyanine, phthalocyanine or styryl based substance or a mixture of these substances for the recording layers; silver (Ag), aluminum (Al) or gold (Au), or a metallic compound based on these substances for the reflecting film; and an acrylic or epoxy ultraviolet curing resin for an adhesive. These materials are not limited to the above-mentioned illustrations either. However, the embodiments concern a recordable optical disc having a plurality of recording layers, and a manufacturing method, etc. will be described later with reference to FIG. 21 regarding the recordable single-sided dual-layer optical disc as an example of the recordable optical disc.

In addition, the case has been described in the example of the above embodiment where the BCA is formed on the L1 layer through the L0 layer. However, when the reflecting layer having the dimensions and configuration as illustrated in FIG. 1 is provided, the material of the L1 layer is selected to correspond to the power of the laser used and its wavelength (it can be selected by trial and error) such that the laser for the BCA can be applied through the dummy substrate 102 (from a dummy substrate side disc surface opposite to the surface in the example described above) to post-cut the BCA information. Part of the L1 layer is deformed or changed by the laser applied through the dummy substrate 102, where the BCA information (the BCA mark in FIG. 16 or the BCA record in FIGS. 17A and 17B) can be post-cut.

FIGS. 17A and 17B are diagrams explaining an example of contents of the BCA record recorded in the BCA in FIG. 16. As illustrated in FIG. 17A, there are written, in this record, a BCA record ID (indicating an HD_DVD book type identifier) at relative byte positions 0 to 1, a version number of an applied standard at a relative byte position 2, a data length at a relative byte position 3, a book type and a disc type of a written standard at a relative byte position 4, and an extended part version at a relative byte position 5, and relative byte positions 6 to 7 are reserved for writing other information.

Sections for the book type and the disc type of the written standard with which the disc is compliant in the BCA record is as illustrated in FIG. 17B. That is, information indicating a standard for the HD_DVD-R can be written in the book type, and a mark polarity flag and a twin format flag can be written in the disc type.

The mark polarity flag in FIG. 17B can indicate during "0b" that the disc is a "Low-to-High" disc in which a signal from the recording mark is larger than a signal from a space (between the adjacent marks), and can indicate during "1b" that the disc is a "High-to-Low" disc in which the signal from the recording mark is smaller than the signal from the space. Moreover, the twin format flag can indicate during "0b" that the disc is not a twin format disc, and can indicate during "1b" that the disc is a twin format disc. When the disc is a twin format disc, the disc (on which the BCA record is recorded) has two recording layers, and the respective layers have individual formats (e.g., an HD_DVD-Video format and an HD_DVD-Video Recording format) set in the DVD forum.

There is no twin format disc in current DVDs, but there can be a twin format disc in the next-generation HD_DVD, so that being able to write the twin format flag in the BCA means much for the recordable multilayer (dual-layer) optical disc according to the one embodiment (a next-generation disc for the HD_DVD).

Figure 18:
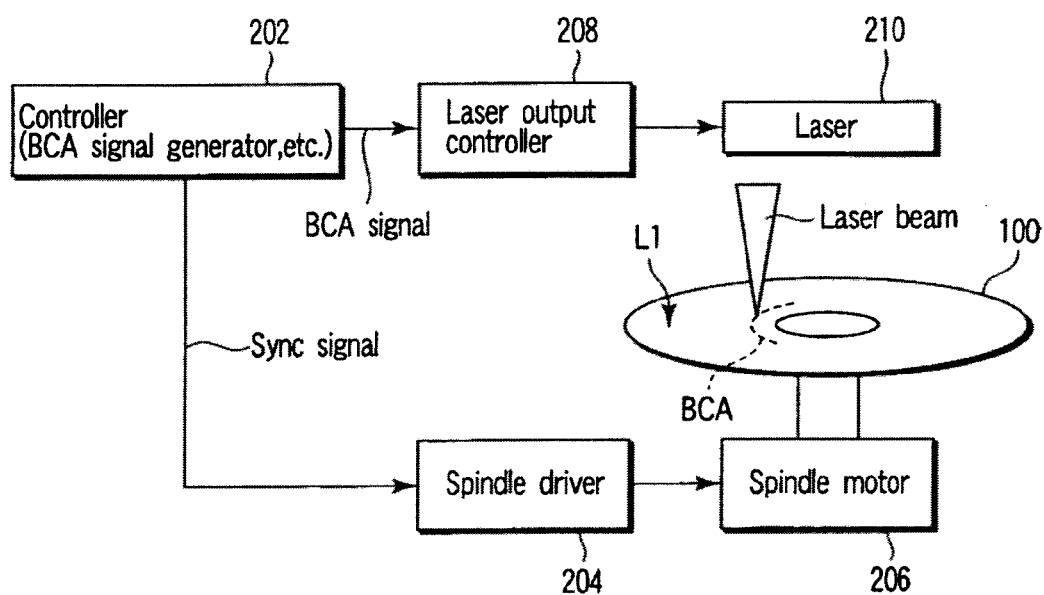
FIG. 18 is an exemplary diagram explaining an example of the configuration of a device for recording specific information including the BCA record, etc.

FIG. 18 is a diagram explaining an example of the configuration of a device for recording specific information including the BCA record, etc. in FIGS. 17A and 17B in the BCA. The recording of the BCA signal (a signal including information such as the BCA record in FIGS. 17A and 17B) by the BCA recording apparatus is carried out for the disc 100 in a completed form. Laser 210 is modulated in accordance with the BCA signal from a controller 202, and the bar-code-shaped BCA mark is recorded synchronously with the rotation of the disc 100. One of the laser wavelengths ranging from 600 nm to 800 nm (650 nm to 780 nm or 680 nm to 780 nm in general) is employed as the laser wavelength of the BCA recording apparatus. In the case of the dual-layer optical disc, a recording place of the BCA is generally located at a radius of about 22.2 mm to 23.1 mm of the inner peripheral portion of the L1 layer. While the laser is applied to the L1 layer through the L0 layer in the case of the BCA recording, the optical absorptance (sensitivity) is adjusted to a wavelength of 650 nm to 780 nm (or 680 nm to 780 nm) in this embodiment (the sensitivity of the L1 layer>the sensitivity of the L0 layer). Therefore, in a practical sense, the BCA signal can be selectively recorded in the L1 layer alone with accuracy.

Thus, the sensitivity (the optical absorptance in the used wavelength) of the dye of each layer is adjusted, such that the BCA signal can be recorded in the next-generation optical disc without any change in the laser wavelength and laser power of the BCA recording apparatus generally used in DVD production lines at present (the laser power is properly increased depending on the situation). Moreover, since the BCA signal can be selectively recorded in the L1 layer alone, there is no extra crosstalk noise from the L0 layer during playback.

That is, in the one embodiment, the sensitivity of the dye of each layer (such as the L0 or L1) is adjusted (e.g., an organic metal is used such that the sensitivity or optical absorptance of the dye of the L1 layer at 600 nm to 800 nm or 650 nm to 780 nm or 680 nm to 780 nm is higher than the sensitivity or optical absorptance of the dye of the L0 layer). Thus, the BCA signal can be recorded in the next-generation optical disc (such as a single-sided dual-layer HD_DVD-R) without any change in the laser wavelength and laser power of the BCA recording apparatus generally used in the DVD production lines at present. At that point, since the BCA information can be selectively recorded in the L1 layer alone, no extra crosstalk noise from the L0 layer is mixed during the playback of the BCA signal.

Furthermore, the BCA information can also be selectively recorded in the L1 layer alone when the laser for the BCA is applied through the dummy substrate 102 to post-cut the BCA information, so that no extra crosstalk noise from the L0 layer is mixed during the playback of the BCA signal.

FIG. 19 is a flowchart explaining one example of a procedure for recording (BCA post-cut) the specific information in the L1 layer of the recordable single-sided multilayer (dual-layer) optical disc in FIG. 16. When the BCA signal including the specific information such as the BCA record in FIGS. 17A and 17B is supplied to a laser output controller 208 from the controller 202 in FIG. 18, laser beam pulses having one of the wavelengths 600 nm to 800 nm (650 nm to 780 nm, or 680 nm to 780 nm) are emitted from the laser diode 210 in correspondence with the contents of the signal (ST10). The laser beam pulses thus emitted are applied to the BCA recording place in the L1 layer through the L0 layer of the disc 100 shown in FIG. 16 (or through the dummy substrate 102) (ST12). This application is continued synchronously with the rotation of the disc 100. When there is no more remaining information to be recorded in the BCA (YES in ST14), the BCA post-cut in the L1 layer through the L0 layer terminates.

FIG. 20 is a flowchart explaining one example of a procedure for playing back the specific information (such as the BCA record) from the L1 layer of the recordable single-sided multilayer (dual-layer) optical disc in FIG. 16. When the information recorded in the BCA is played back, the laser beam having a predetermined wavelength (e.g., 405 nm or 650 nm) is applied to the BCA of the L1 layer through the L0 layer (ST20). The specific information on the optical disc (such as the BCA record in FIGS. 17A and 17B) is read from the reflected light (ST22). The reading is continued synchronously with the rotation of the disc 100. When there is no more remaining information to be read from the BCA (YES in ST24), the BCA playback from the L1 layer through the L0 layer terminates.

Figure 21:
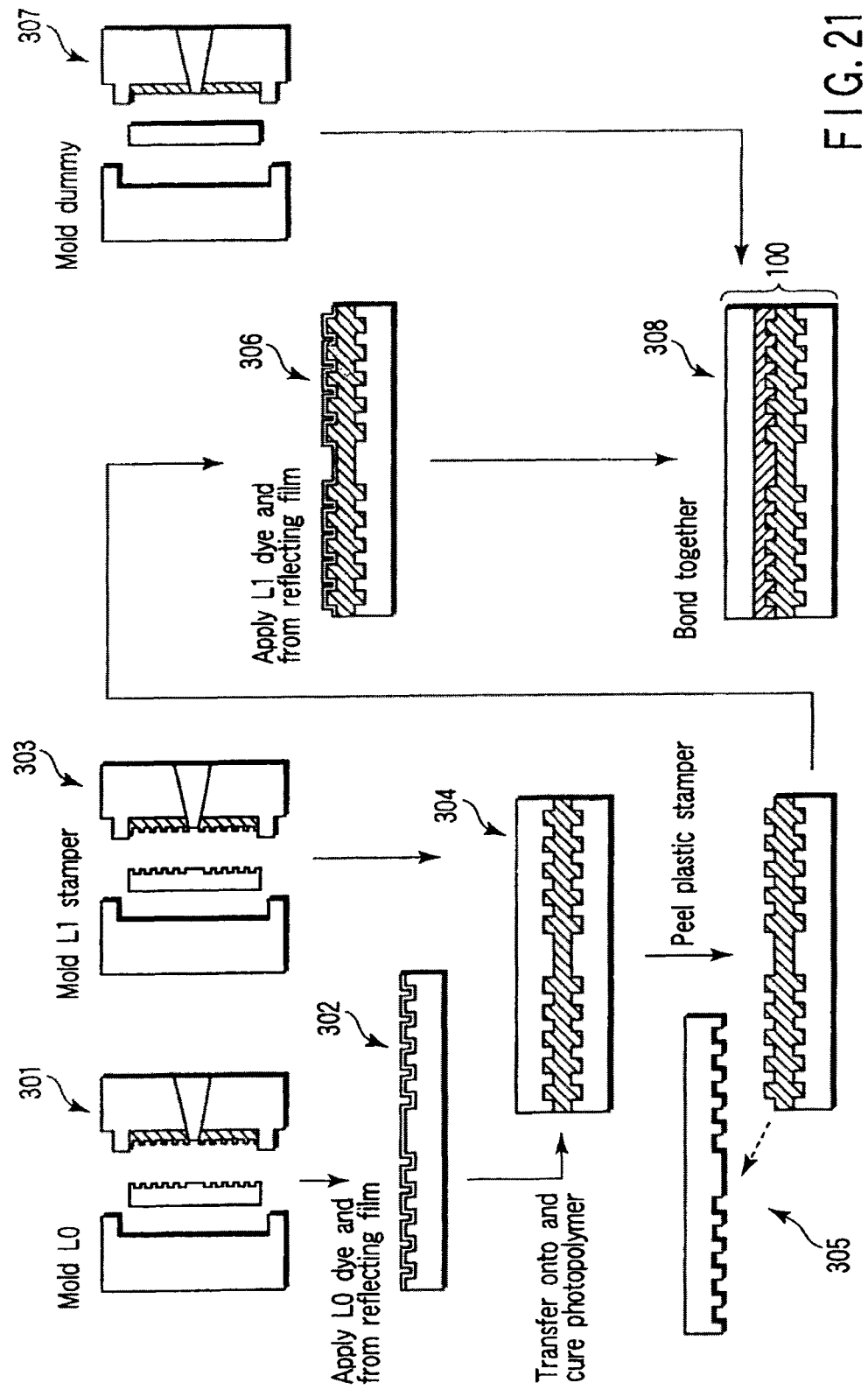
FIG. 21 is an exemplary diagram explaining an example of a process of manufacturing the recordable single-sided dual-layer optical disc according to the one embodiment of this invention.

FIG. 21 is a diagram explaining an example of a process of manufacturing the recordable single-sided dual-layer optical disc according to the one embodiment. A method of manufacturing this recordable dual-layer optical disc will be described below along with FIG. 21. First, a molding plate for the L0 layer is manufactured by injection molding (block 0301). A molding material is generally polycarbonate. The stamper used as a mold for molding the L0 layer is manufactured by Ni plating from a photoresist pattern exposed to the laser. The dimensions of the molding plate include a diameter of 120 mm, an inside diameter of 15 mm and a thickness of 0.6 mm. An organic dye material serving as the recording layer is applied to this molding plate by a known spin coat method, and a metal film (e.g., silver of a silver alloy) serving as the reflecting film is formed by, for example, a known sputter method (block 0302). In addition, this L0 layer is semitransparent to allow the transmission of the laser beam.

In parallel with this, a plastic stamper serving as a mold for the L1 layer is similarly manufactured by injection molding (block 0303). A molding material is generally cycloolefin polymer, but may also be, for example, polycarbonate or acrylic. An Ni stamper for the L1 layer is similarly manufactured by plating with a photoresist exposed to the laser, but the concavity and convexity of the pattern are reverse to those in the L0 layer.

The molding plate of the L0 layer in which the recording layer is formed is bonded to the plastic stamper via a photopolymer, and they are cured by the application of ultraviolet rays (block 0304). Then, the plastic stamper is peeled off to bare the photopolymer layer on which the L1 layer pattern is transferred (block 0305). Next, an organic dye material serving as the recording layer is applied onto photopolymer in the L1 layer by the spin coat method, and a metal film (e.g., silver of a silver alloy) serving as the reflecting film is formed by, for example, the sputter method (block 0306).

In parallel with this, a dummy plate (the material of which is, for example, polycarbonate) is manufactured by injection molding (block 0307), and this dummy plate is bonded by an ultraviolet curing adhesive, thereby completing the recordable dual-layer optical disc (block 0308). In addition, although not shown in the drawing, the dummy plate may be subjected to surface coating for printing by user using, for example, an inkjet printer, or a pattern of, for example, a brand name of the disc manufacturer (or seller) or a product name may be added to the dummy plate.

The dimensions of each layer of the recordable multilayer (dual-layer) R-disc 100 finished in the manner are, for example, as shown in FIG. 1.

In carrying out the embodiments, the material and thickness of the light reflecting layer 108 included in the second recording part (L1) have to be properly set to strictly control the reflection amount of incident light. It is preferable that the thickness of this light reflecting layer (Ag or an Ag alloy) 108 be generally 60 nm to 150 nm. Below 60 nm, the amount of light transmission in the light reflecting layer increases to cause difficulty in obtaining a sufficient amount of reflected light. Then, the gain of a servo detection signal such as a push-pull signal becomes insufficient, which causes difficulty in stable recording/playback. On the other hand, beyond 150 nm, the amount of reflected light increases to an excessive degree, and the influence of the interlayer crosstalk becomes unallowable, leading to significant deterioration in the characteristics of the recording/playback signal.

This will be more concretely described below. When recording/playback is performed in the recording layer 105 of the first recording part (L0), part of the recording/playback light which has passed through the light reflecting layer 106 included in the first recording part (L0) is reflected by the light reflecting layer 108 included in the second recording part (L1), and returns to the first recording part (L0). At this point, in the case where the reflectance of the light reflecting layer 108 included in the second recording part (L1) is high, unnecessary signal components increase when recording/playback is performed in the recording layer 105 of the first recording part (L0), which becomes a factor for significant deterioration in the quality of the recording/playback signal for the first recording part (L0).

Furthermore, because the interlayer crosstalk is greatly influenced by the amounts of reflected light in the first recording part (L0) and the second recording part (L1), a recording position has to be strictly controlled to always carry out stable recording/playback (see the parameters, etc. in FIG. 4).

In addition, it is preferable that the thickness of the light reflecting layer (semi-transmissive reflecting layer using Ag or an Ag alloy) 106 included in the first recording part (L0) be generally 15 nm to 35 nm. Below 15 nm, the amount of light transmission in the light reflecting layer increases to cause difficulty in obtaining a sufficient amount of reflected light. Then, the gain of the servo detection signal such as the push-pull signal becomes insufficient, which causes difficulty in stable recording/playback. At the same time, the influence of the interlayer crosstalk due to the light reflected by the light reflecting layer 108 included in the second recording part (L1) reaches an unallowable level, and the characteristics of the recording/playback signal significantly deteriorate. On the other hand, beyond 35 nm, the amount of reflected light increases to an excessive degree. Then, the gain of the servo detection signal such as the push-pull signal increases, so that the recording/playback is possible, but the recording/playback in the recording layer 107 of the second recording part (L1) is difficult because of a decrease in optical transmittance.

Example 1a

The thickness of the light reflecting layer 106 of the L0 is 25 nm, and the thickness of the light reflecting layer 108 of the L1 is 100 nm (the thickness of the L1 reflecting layer>the thickness of the L0 reflecting layer), in which case an optimum reflection amount can be obtained, and the interlayer crosstalk can be reduced. At the same time, BCA recording through the dummy substrate 102 can be stably carried out, and a sufficient signal modulation factor can be obtained in this BCA recording.

Example 2a

The thickness of the light reflecting layer 106 of the L0 is 20 nm, and the thickness of the light reflecting layer 108 of the L1 is 80 nm (the thickness of the L1 reflecting layer>the thickness of the L0 reflecting layer), in which case an optimum reflection amount can be obtained and the interlayer crosstalk can be reduced likewise. At the same time, BCA recording through the dummy substrate 102 can be stably carried out, and a sufficient signal modulation factor can be obtained in this BCA recording.

Example 1b

When the thickness of the light reflecting layer 108 of the L1 is 100 nm, an optimum reflection amount can be obtained, and the interlayer crosstalk can be reduced. At the same time, BCA recording through the dummy substrate 102 can be stably carried out, and a sufficient signal modulation factor can be obtained.

Example 2b

The light reflecting layer 108 of the L1 is manufactured as in Example 1b, and the quality of the playback signal in the system lead-out area (a right area shown in FIG. 7) is evaluated. As a result, it has been confirmed that a sufficient signal modulation factor can be obtained.

Example 1c

The thickness of the light reflecting layer 106 of the L0 is 25 nm, the thickness of the light reflecting layer 108 of the L1 is 100 nm, and the thickness of the intermediate layer 104 over the entire surface of the disc is 27 µm±2 µm (a more concrete example of a range of 25±10 µm), in which case an optimum reflection amount can be obtained, and the interlayer crosstalk can be reduced. At the same time, BCA recording through the dummy substrate 102 can be stably carried out, and a sufficient signal modulation factor can be obtained.

Example 2c

The thickness of the light reflecting layer 106 of the L0 is 20 nm, the thickness of the light reflecting layer 108 of the L1 is 80 nm, and the thickness of the intermediate layer over the entire surface of the disc is 27 µm±2 µm, in which case an optimum reflection amount can be obtained, and the interlayer crosstalk can be reduced. At the same time, BCA recording through the dummy substrate 102 can be stably carried out, and a sufficient signal modulation factor can be obtained.

Comparative Example 1a

Ground 1 that the Thickness of the Reflecting Layer 106 of the L0 is 15 nm or More and 35 nm or Less The thickness of the light reflecting layer 106 of the L0 is increased to 40 nm, and the thickness of the light reflecting layer 108 of the L1 is 200 nm, in which case the amount of light transmitted to the L1 decreases. Therefore, the gain of the unrecorded servo signal at the time of recording in the L1 is significantly decreased, and stable recording/playback is difficult. At the same time, BCA recording through the dummy substrate is difficult, and a signal modulation factor in the BCA recording part is decreased, so that a sufficient signal quality can not be obtained.

Comparative Example 2a

Ground 2 that the Thickness of the Reflecting Layer 106 of the L0 is 15 nm or More and 35 nm or Less The thickness of the light reflecting layer 106 of the L0 is increased to 40 nm, and the thickness of the light reflecting layer 108 of the L1 is 100 nm, in which case the amount of light transmitted to the L1 again decreases. Therefore, the gain of the unrecorded servo signal at the time of recording in the L1 is significantly decreased, and stable recording/playback is difficult.

Comparative Example 3a

Ground 3 that the Thickness of the Reflecting Layer 106 of the L0 is 15 nm or More and 35 nm or Less The thickness of the light reflecting layer 106 of the L0 is decreased to 13 nm, and the thickness of the light reflecting layer 108 of the L1 is 100 nm, in which case the transmission of light to the L1 increases, and the reflection of light from the recording layer of the L1 increases at the same time. As a result, unnecessary signal components increase during the recording/playback in the recording layer of the L0, and the characteristics of the L0 deteriorate.

Comparative Example 1b

Ground 1 that the Thickness of the Reflecting Layer 108 of the L1 is 60 nm or More and 150 nm or Less When the thickness of the light reflecting layer 108 of the L1 is larger than 150 nm, the amount of reflection in this light reflecting layer 108 increases, and the interlayer crosstalk increases, so that the quality of a signal in the recording layer 105 of the L0 tends to significantly deteriorate. At the same time, BCA recording through the dummy substrate 102 is difficult, and a signal modulation factor in the BCA recording part decrease, so that a sufficient signal quality can not be obtained for the BCA information (150 nm is considered a practical upper limit, and 100 nm or less is practically preferable).

Comparative Example 2b

Ground 2 that the Thickness of the Reflecting Layer 108 of the L1 is 60 nm or More and 150 nm or Less When the thickness of the light reflecting layer 108 of the L1 is decreased to 50 nm, the amount of reflected light in the L1 decreases, so that the gain of the unrecorded servo signal is significantly decreased, and stable recording/playback is difficult.

Comparative Example 3b

Ground that the Thickness of the Reflecting Layer 106 of the L0 has to be 15 nm or More When the thickness of the light reflecting layer 106 of the L0 is 13 nm, the transmission of light to the L1 increases, so that the reflection of light from the recording layer 107 of the L1 increases, unnecessary signal components increase during the recording/playback in the recording layer 106 of the L0, resulting in deterioration in the recording/playback characteristics of the L0.

Comparative Example 1c

Ground 1 that the Thickness of the Intermediate Layer 104 is 25 µm±10 µm

The thickness of the light reflecting layer 106 of the L0 is 25 nm, the thickness of the light reflecting layer 108 of the L1 is 100 nm, and the thickness of the intermediate layer 104 over the entire surface of the disc is 35 µm±2 µm, in which case the distance from the laser receiving surface of the disc 100 to the L1 increases, so that the spot shape of the recording/playback laser beam becomes unclear, and the recording/playback signal deteriorates, with the result that stable recording/playback tends to be difficult (35 µm is considered a practical upper limit).

Comparative Example 2c

Ground 2 that the Thickness of the Intermediate Layer 104 is 25 µm±10 µm

The thickness of the light reflecting layer 106 of the L0 is 25 nm, the thickness of the light reflecting layer 108 of the L1 is 100 nm, and the thickness of the intermediate layer 104 over the entire surface of the disc is 15 µm±2 µm, in which case the distance from the laser receiving surface of the disc 100 to the L1 decreases, so that the spot shape of the recording/playback laser beam becomes unclear, and the recording/playback signal deteriorates, with the result that stable recording/playback tends to be difficult (15 µm is considered a practical lower limit).

Comparative Example 3c

Ground that the Thickness of the Reflecting Layer 106 of the L0 is 15 nm or More Even when the Thickness of the Intermediate Layer 104 is 25±10 µm The thickness of the light reflecting layer 106 of the L0 is decreased to 13 nm, the thickness of the light reflecting layer 108 of the L1 is 100 nm, and the thickness of the intermediate layer 104 over the entire surface of the disc is 25 µm±2 µm, in which case the transmission of light to the L1 increases. At this same time, the reflection of light from the reflecting layer 108 of the L1 increases, unnecessary signal components increase during the recording/playback in the recording layer 105 of the L0, resulting in deterioration in the characteristics of the L0. That is, in the embodiment of the configuration as shown in FIG. 1, the selection of the thickness of the reflecting layer 106 of the L0 is severer than the selection of the thickness of the intermediate layer 104.

When any one of the embodiments is carried out to adjust the material of the reflecting film and the thickness of the reflecting film in the optical recording medium having two or more recording layers, the interlayer crosstalk between the first recording layer and the second recording layer is reduced, and stable and high-quality recording characteristics can be obtained. Further, the BCA recording can be stably performed in the second recording layer through the dummy substrate, and a sufficient BCA signal modulation factor can be obtained.

In addition, this invention is not limited to the embodiments described above, and various modifications can be made without deviating from the spirit thereof on the basis of technology available at the time in a current or future execution phase. For example, the embodiments can be carried out for a single-sided optical disc having three or more layers and even for an optical disc using short-wavelength laser at a wavelength of 400 nm or less. Moreover, a suitable combination of the embodiments may be carried out as much as possible in which case combined effects can be obtained. Further, the embodiments described above include inventions at various stages, and suitable combinations of a plurality of disclosed constitutional requirements permit various inventions to be extracted. For example, even when some of all the constitutional requirements shown in the embodiments are eliminated, a configuration in which those constitutional requirements are eliminated can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disc comprising first and second recording layers configured to store or reproduce information by light with a predetermined wavelength, the information being configured to be recorded on the first or second recording layer using a mark and a space, and the first or second recording layer having a low-to-high characteristic, wherein
    a channel clock period is represented by T, the channel clock period T being provided for recording the mark on the first or second recording layer where the mark regarding 3T can be recorded,
    a plurality of pulses including a last pulse arranged at an end of the pulses are used for recording the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level but higher than the first subsequent level is arranged next to the first subsequent level, and
    the optical disc further comprises a 25±10 µm-thick layer arranged between the first and second recording layers.

2. An information recording method using an optical disc comprising first and second recording layers configured to store or reproduce information by light with a predetermined wavelength, the information being configured to be recorded on the first or second recording layer using a mark and a space, and the first or second recording layer having a low-to-high characteristic, wherein
    a channel clock period is represented by T, the channel clock period T being provided for recording the mark on the first or second recording layer where the mark regarding 3T can be recorded,
    a plurality of pulses including a last pulse arranged at an end of the pulses are used for recording the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level but higher than the first subsequent level is arranged next to the first subsequent level, and the optical disc further comprises a 25±10 μm-thick layer arranged between the first and second recording layers, the method comprising:

recording information on the first or second recording layer.

3. An information reproducing method using an optical disc comprising first and second recording layers configured to store or reproduce information by light with a predetermined wavelength, the information being configured to be recorded on the first or second recording layer using a mark and a space, and the first or second recording layer having a low-to-high characteristic, wherein a channel clock period is represented by T, the channel clock period T being provided for recording the mark on the first or second recording layer where the mark regarding 3T can be recorded, a plurality of pulses including a last pulse arranged at an end of the pulses are used for recording the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level but higher than the first subsequent level is arranged next to the first subsequent level, and the optical disc further comprises a 25±10 μm-thick layer arranged between the first and second recording layers, the method comprising:

reproducing information from the first or second recording layer.

* * * * *